US012775111B2

(12) United States Patent
Yu

(10) Patent No.: US 12,775,111 B2
(45) Date of Patent: Oct. 27, 2026

(54) METHODS AND SYSTEMS FOR CONTROLLING AN IMAGING DEVICE, AND DETECTING PARAMETERS OF A DETECTOR

(71) Applicant: SHANGHAI UNITED IMAGING HEALTHCARE CO., LTD., Shanghai (CN)

(72) Inventor: Jingyi Yu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 171 days.

(21) Appl. No.: 18/761,579

(22) Filed: Jul. 2, 2024

(65) Prior Publication Data

US 2024/0353583 A1 Oct. 24, 2024

Related U.S. Application Data

(63) Continuation of application No. PCT/CN2023/104268, filed on Jun. 29, 2023.

(30) Foreign Application Priority Data

Jun. 29, 2022 (CN) ......................... 202210750844.2
Jun. 29, 2022 (CN) ......................... 202210753136.4

(51) Int. Cl.
*G01T 7/00* (2006.01)
*G01T 1/02* (2006.01)
*G01T 1/24* (2006.01)

(52) U.S. Cl.
CPC .............. *G01T 7/005* (2013.01); *G01T 1/026* (2013.01); *G01T 1/244* (2013.01)

(58) Field of Classification Search
CPC ......... G01T 7/005; G01T 1/026; G01T 1/244; A61B 6/4233; A61B 6/585
See application file for complete search history.

(56) References Cited

U.S. PATENT DOCUMENTS 4,465,932 A 8/1984 Burgemeister
9,348,036 B2 5/2016 Yamakawa et al.
(Continued)

FOREIGN PATENT DOCUMENTS

CN 105105782 A 12/2015
CN 108392214 A 8/2018
(Continued)

OTHER PUBLICATIONS

International Search Report in PCT/CN2023/104268 mailed on Oct. 8, 2023, 5 pages.
(Continued)

*Primary Examiner* — Kiho Kim
(74) *Attorney, Agent, or Firm* — METIS IP LLC

(57) ABSTRACT

Embodiments of the present disclosure provide methods and systems for controlling an imaging device, and detecting parameters of a detector. The method may include applying a voltage on a semiconductor crystal of a detector of the imaging device; obtaining a current of the semiconductor crystal; determining, based on the voltage, the current, and at least one preset relationship, at least one parameter of the semiconductor crystal; and calibrating and/or controlling the imaging device based on the at least one parameter.

18 Claims, 12 Drawing Sheets

200

(56) References Cited

U.S. PATENT DOCUMENTS

| | | | | |
|---|---|---|---|---|
| 9,977,135 | B2 * | 5/2018 | Yokoyama | G01T 1/026 |
| 2007/0029496 | A1 | 2/2007 | Bouhnik et al. | |
| 2010/0104159 | A1 | 4/2010 | Hirokawa et al. | |
| 2013/0083227 | A1 * | 4/2013 | Murata | H04N 25/531 348/308 |
| 2013/0248729 | A1 | 9/2013 | Hannemann et al. | |
| 2014/0072098 | A1 | 3/2014 | Kappler | |
| 2015/0103865 | A1 | 4/2015 | Yano et al. | |
| 2015/0177394 | A1 | 6/2015 | Dolinsky et al. | |
| 2017/0350993 | A1 * | 12/2017 | Shahar | G01T 1/244 |
| 2018/0158215 | A1 | 6/2018 | Pang et al. | |
| 2019/0235101 | A1 * | 8/2019 | Erler | G01N 23/046 |
| 2021/0251588 | A1 | 8/2021 | Kanai et al. | |
| 2022/0107431 | A1 * | 4/2022 | Taherion | G01T 1/24 |

FOREIGN PATENT DOCUMENTS

| | | | |
|---|---|---|---|
| CN | 113391339 | A | 9/2021 |
| DE | 19730519 | A1 | 1/1999 |
| JP | 2007121010 | A | 5/2007 |
| TW | 200917822 | A | 4/2009 |

OTHER PUBLICATIONS

Written Opinion in PCT/CN2023/104268 mailed on Oct. 8, 2023, 4 pages.

* cited by examiner

200

400

1000

METHODS AND SYSTEMS FOR CONTROLLING AN IMAGING DEVICE, AND DETECTING PARAMETERS OF A DETECTOR

CROSS-REFERENCE TO RELATED APPLICATIONS

This application is a Continuation of International Application No. PCT/CN2023/104268, filed on Jun. 29, 2023, which claims priority to Chinese Patent Application No. 202210753136.4, filed on Jun. 29, 2022, and Chinese Patent Application No. 202210750844.2, filed on Jun. 29, 2022, the entire contents of each of which are incorporated herein by reference.

TECHNICAL FIELD

The present disclosure relates to the field of medical technology, in particular, to methods and systems for controlling an imaging device, and detecting parameters of a detector.

BACKGROUND

A photon-counting computed tomography (CT) technique is an important development direction for imaging device (e.g., a CT device), and its core lies in the use of a photon-counting detector. The pulse stacking may occur in the process of using the photon-counting detector, so that a density of an output signal is not linearly proportional to a radiation dose of the detector. Due to the polarization effect of the semiconductor crystal during an irradiation and the inherent features of an output circuit of the detector, the output signal of the photon-counting detector exhibits instability during the X-ray irradiation. Then the photon-counting detector needs to be calibrated using a more complicated calibration operation before using the output signal (e.g., a count of output photons) of the photon-counting detector to quantitatively monitor the radiation dose of the detector in real time. If an energy integration reference detector is added to a CT system to obtain a good linear relationship between the density of the output signal and the radiation dose of the detector, and thus, the complexity of the CT system may increase.

During the use of the photon-counting detector, a temperature of the semiconductor crystal may change. The detection performance of the semiconductor crystal is very sensitive to the temperature. If the temperature of the semiconductor crystal exceeds a certain temperature range, the detector's working state may be abnormal. At present, the temperature of the semiconductor crystal in the detector is measured using a temperature sensor integrated in the output circuit. Due to the lack of close contact between an output chip and the semiconductor crystal in the output circuit, there may be structures with poor thermal conductivity (e.g., an intermediate layer and a conductive silver glue) between the output chip and the semiconductor crystal. Therefore, the temperature of the output chip cannot directly represent the temperature of the semiconductor crystal.

Therefore, it is desirable to provide methods and systems for controlling an imaging device and detecting parameters of a detector. By using the features of the current and the voltage on the semiconductor crystal in the detector, at least one parameter of the detector (e.g., a radiation dose, the temperature of the semiconductor crystal, etc.) may be determined, and the imaging device may be calibrated and/or controlled, which may improve the efficiency and accuracy of real-time quantitative monitoring of radiation dose, and there is no need to introduce additional reference detectors in the CT system, reducing the complexity for the system design, thus improving the accuracy of determining the temperature of semiconductor crystals, which is beneficial for monitoring and improving the detector performance.

SUMMARY

An aspect of the present disclosure provides a method implemented on at least one machine each of which has at least one processor and at least one storage device for controlling an imaging device. The method may include applying a voltage on a semiconductor crystal of a detector of the imaging device; obtaining a current of the semiconductor crystal; determining, based on the voltage, the current, and at least one preset relationship, at least one parameter of the semiconductor crystal; and calibrating and/or controlling the imaging device based on the at least one parameter.

Another aspect of the present disclosure provides a system for controlling an imaging device. The system may include at least one storage device storing a set of instructions; and at least one processor in communication with the storage device, wherein when executing the set of instructions, the at least one processor is configured to cause the system to perform operations including: applying a voltage on a semiconductor crystal of a detector of the imaging device; obtaining a current of the semiconductor crystal; determining, based on the voltage, the current, and at least one preset relationship, at least one parameter of the semiconductor crystal; and calibrating and/or controlling the imaging device based on the at least one parameter.

Another aspect of the present disclosure provides a method implemented on at least one machine each of which has at least one processor and at least one storage device for detecting an X-ray radiation dose. The method may include: irradiating a first semiconductor crystal of a detector using an X-ray generated by a tube; obtaining a voltage of the first semiconductor crystal and a photocurrent of the first semiconductor crystal, the photocurrent being generated by an irradiation of the X-ray on the first semiconductor crystal; and determining, based on the voltage, the photocurrent, and a preset relationship, a radiation dose received by the first semiconductor crystal.

Another aspect of the present disclosure provides a system for detecting an X-ray radiation dose. The system may include at least one storage device storing a set of instructions; and at least one processor in communication with the storage device, wherein when executing the set of instructions, the at least one processor is configured to cause the system to perform operations including: irradiating a first semiconductor crystal of a detector using an X-ray generated by a tube; obtaining a voltage of the first semiconductor crystal and a photocurrent of the first semiconductor crystal, the photocurrent being generated by an irradiation of the X-ray on the first semiconductor crystal; and determining, based on the voltage, the photocurrent, and a preset relationship, a radiation dose received by the first semiconductor crystal.

Another aspect of the present disclosure provides a method implemented on at least one machine each of which has at least one processor and at least one storage device for detecting a temperature of an X-ray detector. The method may include obtaining a voltage of a semiconductor crystal and a dark current of the semiconductor crystal, the dark current being generated in the semiconductor crystal under a voltage applied on the semiconductor crystal; and determining, based on the voltage, the dark current, and a preset relationship, a temperature of the semiconductor crystal.

Another aspect of the present disclosure provides a system for detecting a temperature of an X-ray detector. The system may include at least one storage device storing a set of instructions; and at least one processor in communication with the storage device, wherein when executing the set of instructions, the at least one processor is configured to cause the system to perform operations including: obtaining a voltage of a semiconductor crystal and a dark current of the semiconductor crystal, the dark current being generated in the semiconductor crystal under a voltage applied on the semiconductor crystal; and determining, based on the voltage, the dark current, and a preset relationship, a temperature of the semiconductor crystal.

Another aspect of the present disclosure provides a system for controlling an imaging device. The system may include: an applying module, configured to apply a voltage on a semiconductor crystal of a detector of the imaging device; an acquisition module, configured to obtain a current of the semiconductor crystal; a determination module, configured to determine, based on the voltage, the current, and at least one preset relationship, at least one parameter of the semiconductor crystal; and a calibration/control module, configured to calibrate and/or control the imaging device based on the at least one parameter.

Another aspect of the present disclosure provides a system for detecting an X-ray radiation dose. The system may include an irradiation module, configured to irradiate a first semiconductor crystal of a detector using an X-ray generated by a tube; an acquisition module, configured to obtain a voltage of the first semiconductor crystal and a photocurrent of the first semiconductor crystal, the photocurrent being generated by an irradiation of the X-ray on the first semiconductor crystal; and a determination module, configured to determine, based on the voltage, the photocurrent, and a preset relationship, a radiation dose received by the first semiconductor crystal.

Another aspect of the present disclosure provides an X-ray detector of a system for detecting an X-ray radiation dose. The X-ray detector may include a first semiconductor crystal and a circuit device. The first semiconductor crystal may be configured to convert an X-ray generated by a tube into a photocurrent directly; and the circuit device may be configured to obtain a voltage applied on the first semiconductor crystal and the photocurrent, and determine the X-ray radiation dose of the X-ray detector by using a photocurrent feature of the first semiconductor crystal and a voltage feature of the first semiconductor crystal.

Another aspect of the present disclosure provides a system for detecting a temperature of an X-ray detector. The system may include an acquisition module, configured to obtain a voltage of a semiconductor crystal and a dark current of the semiconductor crystal, the dark current being generated in the semiconductor crystal under a voltage applied on the semiconductor crystal; and a determination module, configured to determine, based on the voltage, the dark current, and a preset relationship, a temperature of the semiconductor crystal.

Another aspect of the present disclosure provides an X-ray detector of a system for detecting a temperature of the X-ray detector. The X-ray detector may include a semiconductor crystal and a circuit device. The semiconductor crystal may be configured to convert an X-ray generated by a tube into a dark current directly; and the circuit device may be configured to obtain a voltage applied on the semiconductor crystal and the dark current, and determine a temperature of the semiconductor crystal of the X-ray detector by using a dark current feature of the semiconductor crystal and a voltage feature of the semiconductor crystal.

Another aspect of the present disclosure provides a non-transitory computer readable medium storing instructions, the instructions, when executed by at least one processor, causing the at least one processor to implement a method for controlling an imaging device, a method for detecting an X-ray radiation dose, or a method for detecting a temperature of an X-ray detector according to above descriptions.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
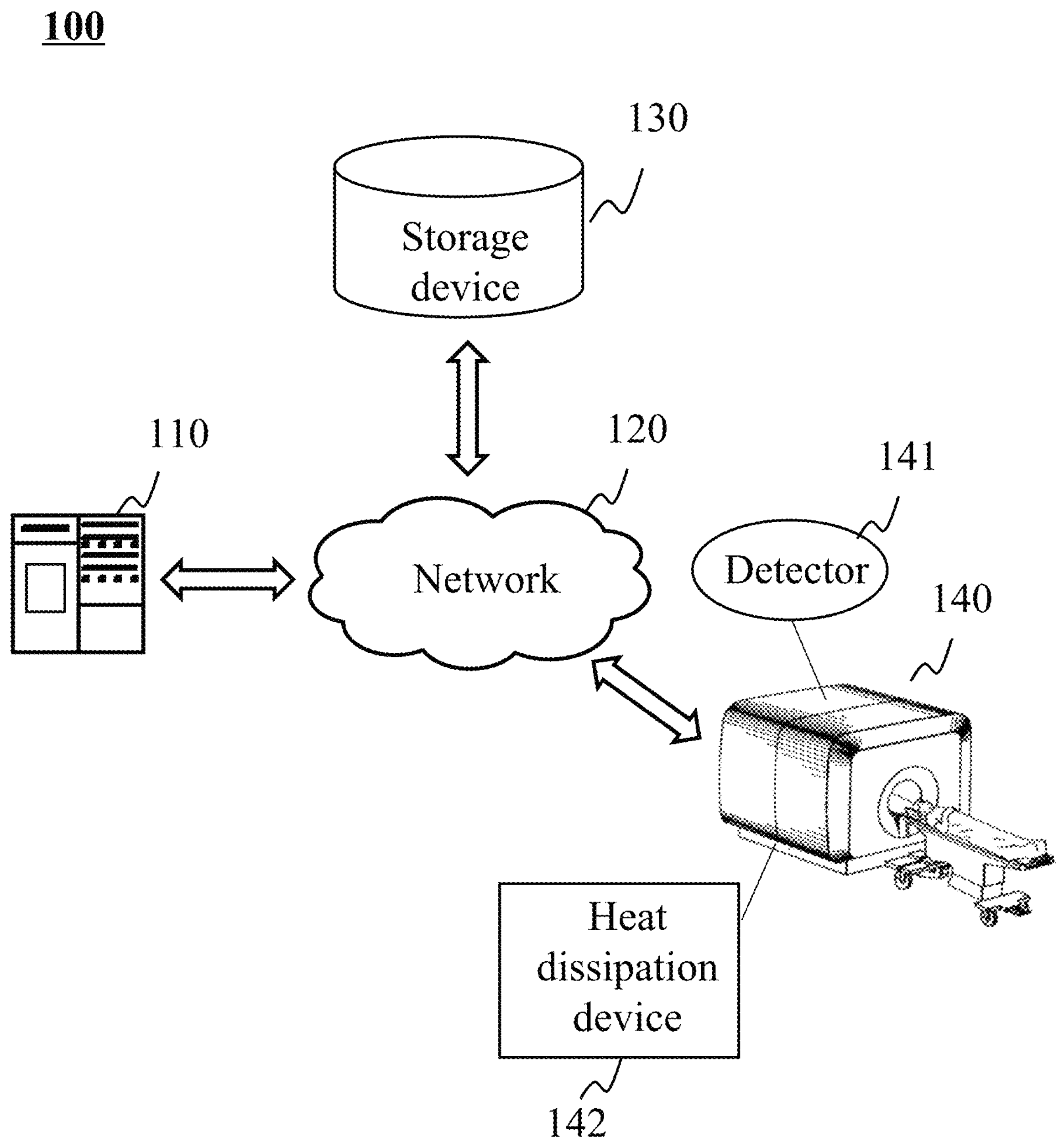
FIG. 1 is a schematic diagram illustrating an exemplary application scenario of an imaging system according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary application scenario of an imaging system according to some embodiments of the present disclosure. As shown in FIG. 1, the application scenario 100 of the imaging system may include at least one of a processing device 110, a network 120, a storage device 130, and an imaging device 140. The imaging system may include a sub-system for calibrating and/or controlling the imaging device, and a sub-system for detecting parameters of a detector (e.g., a sub-system for detecting a radiation dose, a sub-system for detecting a temperature of the detector), or the like.

In some embodiments, the processing device 110 may process information and/or data related to the application scenario 100 (e.g., controlling and/or calibrating the imaging device, detecting the parameter of the detector, etc.) of the imaging system to perform one or more operations described in the present disclosure. For example, the processing device 110 may irradiate a first semiconductor crystal of the detector using an X-ray generated by a tube. For example, the processing device 110 may obtain a voltage and a photocurrent applied to the first semiconductor crystal. The processing device 110 may obtain a voltage and a dark current applied to a semiconductor crystal. As another example, the processing device 110 may determine the radiation dose corresponding to the first semiconductor crystal based on the voltage, photocurrent, and a preset relationship. For example, the processing device 110 may determine the temperature of the semiconductor crystal based on the voltage, the dark current, and the preset relationship.

In some embodiments, the processing device 110 may include one or more processing engines (e.g., a single chip processing engine or a multi-chip processing engine). Merely by way of example, the processing device 110 may include a central processing unit (CPU), an application specific integrated circuit (ASIC), an application specific instruction set processor (ASIP), a graphics processing unit (GPU), a physics processing unit (PPU), a digital signal processor (DSP), a field programmable gate array (FPGA), a programmable logic circuit (PLD), a controller, a micro-controller unit, a reduced instruction set computer (RISC), a microprocessor, or any combination thereof.

The network 120 may connect various components of the system and/or connect the system with external resource parts. The network 120 may enable a communication between various components and with other parts outside the system. For example, the processing device 110 may obtain a voltage and a photocurrent applied to a first semiconductor crystal from the imaging device 140 via the network 120.

In some embodiments, the network 120 may be any wired or wireless network, or any combination thereof. For example, the network 120 may include a cable network, an optical fiber network, a telecommunication network, the Internet, a local area network (LAN), a wide area network (WAN), a wireless local area network (WLAN), a metropolitan area network (MAN), a public switched telephone network (PSTN), a Bluetooth network, a ZigBee network, a near field communication (NFC), an intra device bus, intra device lines, cable connections, or any combination thereof. A network connection between various parts may be done in one of the above ways or in multiple ways. In some embodiments, the network may be a variety of topology structures such as point-to-point, shared, central, or the like, or a combination thereof.

The storage device 130 may be used to store data and/or instructions related to the application scenario 100 of the imaging system. In some embodiments, the storage device 130 may store data and/or information obtained from the processing devices 110, the imaging device 140, etc. For example, storage device 130 may store a preset relationship (e.g., a first relationship, a second relationship), a table or calculation formulas for different parameters of the first semiconductor crystal.

In some embodiments, the storage device 130 may include one or more storage components, each of which may be an independent device or a part of other devices. In some embodiments, the storage device 130 may be provided in the processing device 110. In some embodiments, the storage device 130 may include a random-access memory (RAM), a read-only memory (ROM), a mass memory, a removable memory, a volatile read-write memory, or any combination thereof. For example, the mass memory may include a disk, an optical disk, a solid-state disk, etc. In some embodiments, the storage device 130 may be implemented on a cloud platform.

Figure 7:
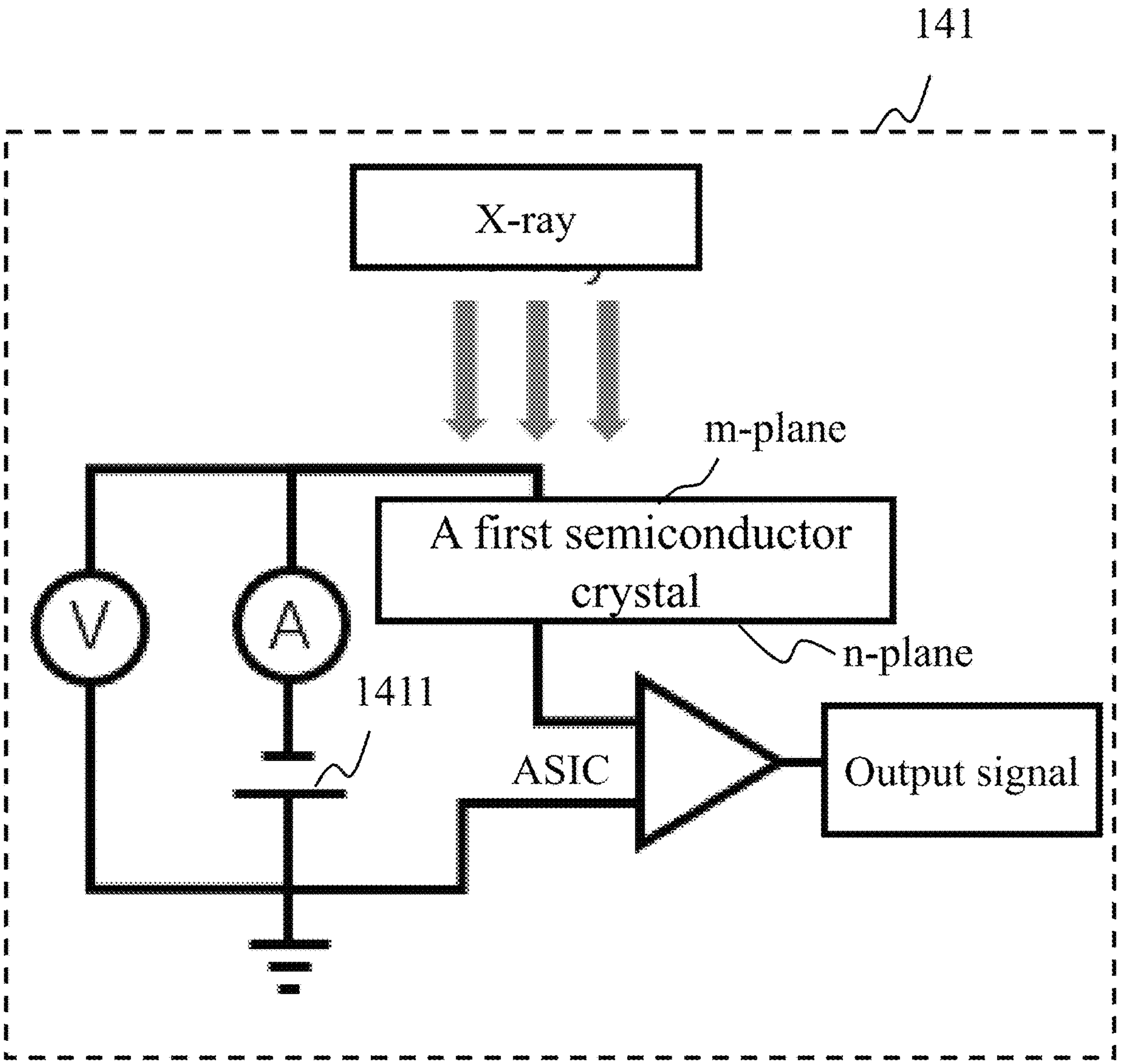
FIG. 7 is a schematic diagram illustrating an exemplary process for determining a radiation dose of a photon-counting computed tomography (CT) detector according to some embodiments of the present disclosure.

The imaging device 140 may refer to a device for scanning a human body to obtain scanning data. For example, the imaging device may include a computed tomography (CT) device, etc. The CT device may include a plurality of components, among which a tube, a detector 141, heat dissipation device 142 etc., may be important components of the CT device. The detector of the CT device may include various types of detectors, such as an energy integration detector, a photon counting detector, etc. The semiconductor crystal is an important component of the photon-counting detector. In some embodiments, the X-ray detector of the sub-system for detecting a radiation dose may include a first semiconductor crystal and a circuit device, wherein the first semiconductor crystal may be used to directly convert an X-ray generated by a tube into a photocurrent. The circuit device may be used to determine a voltage applied on the first semiconductor crystal and the photocurrent, and use a photocurrent feature of the first semiconductor crystal and a voltage feature of the first semiconductor crystal to determine the radiation dose of the X-ray detector. In some embodiments, the X-ray detector of the sub-system for detecting a temperature of the X-ray detector may include a semiconductor crystal and a circuit device, wherein the semiconductor crystal may be used to directly convert an X-ray generated by a tube into a dark current, the circuit device may be used to obtain a voltage applied on the semiconductor crystal and the dark current, and use a dark current feature of the semiconductor crystal and a voltage feature of the semiconductor crystal to determine a temperature of the semiconductor crystal of the X-ray detector. As shown in FIG. 7, the photon-counting detector 141 includes a first semiconductor crystal, the X-ray is transmitted to the first semiconductor crystal, and the incident X-ray may be converted into an electrical signal (e.g., an electron and a hole). The electrical signal may be converted into an output signal through the ASIC. The output signal may be a digital signal, and the output signal of the photon-counting detector may be represented by performing a photon counting for different energy ranges. The heat dissipation device 142 may include a heat dissipation component, a fan, etc. The heat dissipation device may be used to dissipate heat from the semiconductor crystal. In some embodiments, the heat dissipation device 142 is unnecessary.

It should be noted that the above descriptions for the application scenario 100 are merely provided for illustrative purposes and may not be intended to limit the scope of the present disclosure. For those of ordinary skill in the art, various changes and modifications may be made under the guidance of the present disclosure. For example, the application scenario 100 of the imaging system may be implemented on other device to achieve similar or different functions. However, these changes and modifications may not deviate from the scope of the present disclosure.

Figure 2:
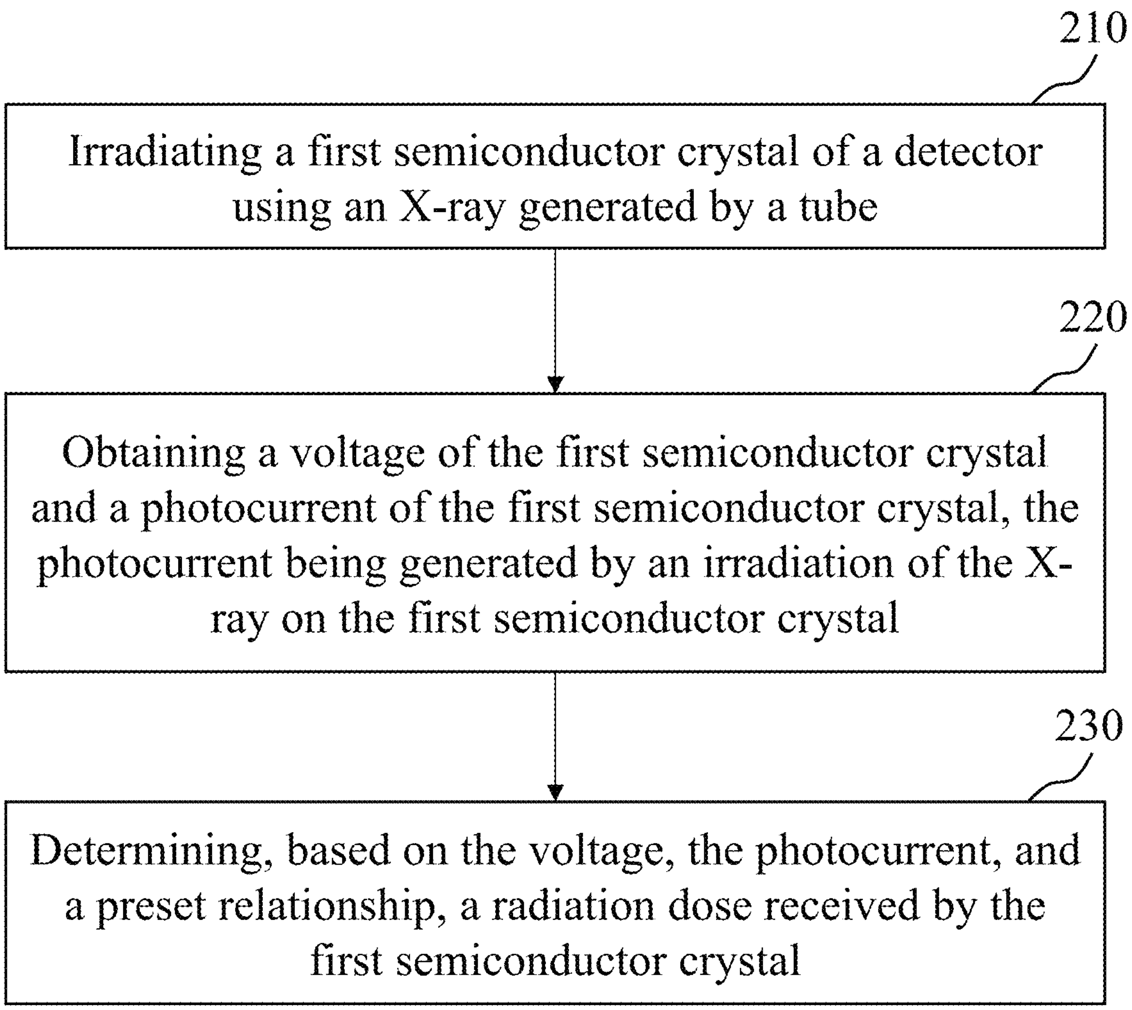
FIG. 2 is a flowchart illustrating an exemplary process for detecting an X-ray radiation dose according to some embodiments of the present disclosure.

FIG. 2 is a flowchart illustrating an exemplary process for detecting an X-ray radiation dose according to some embodiments of the present disclosure. As shown in FIG. 2, process 200 may include one or more of the following operations. In some embodiments, process 200 may be performed by the processing device 110.

In 210, a first semiconductor crystal of a detector may be irradiated using an X-ray generated by a tube. In some embodiments, operation 210 may be performed by an irradiation module 610.

A semiconductor crystal may be an important component of a photon-counting detector. In some embodiments, the photon-counting detector may include a plurality of semiconductor crystals. Different semiconductor crystals may be located at different positions in the photon-counting detector. The different positions of the photon-counting detector may include positions that are obstructed by the human body, positions that are not obstructed by the human body, etc. The positions that are not obstructed by the human body may include a certain section of the tube, and both ends of the semi-curved detector, etc. In some embodiments, the semiconductor crystal may include a first semiconductor crystal, a second crystal, and/or other crystals on the detector. The first semiconductor crystal may be arranged at a position in the photon-counting detector that is not obstructed by the human body. The semiconductor crystal may be a crystal with the same material and/or the same structure as the first semiconductor crystal. The semiconductor crystal has a certain thickness, such as a thickness of 2 mm. In some embodiments, the semiconductor crystal may be cadmium zinc telluride (CdZnTe, CZT) crystal. The different positions of the different semiconductor crystals in the photon-counting detector and/or thickness of the different semiconductor crystals may be provided based on actual needs.

In some embodiments, the semiconductor crystal (e.g., the first semiconductor crystal, etc.) may include a semiconductor material. The semiconductor crystal (e.g., the first semiconductor crystal, etc.) may be a photoresistor and/or a thermistor. If the semiconductor crystal is not irradiated by an X-ray, a certain concentration of electrons and holes may exist inside the semiconductor crystal, for example, the concentration of holes is A. After the semiconductor crystal is irradiated by the X-ray, electrons and a hole cloud may be generated inside the semiconductor crystal, and the hole cloud may be holes with a certain concentration, for example, the concentration of holes in the hole cloud is B. A resistance of the semiconductor crystal (e.g., the first semiconductor crystal, etc.) may be determined based on concentration(s) of carrier(s) (e.g., a sum of concentrations of the holes) inside the semiconductor. For example, the resistance of the semiconductor crystal is the sum of the concentration of the holes (e.g., the concentration A of holes) of the semiconductor crystal when not being irradiated by the X-ray, and the concentration of the holes (e.g., the concentration B of holes) when being irradiated by the X-ray. If the radiation dose of X-rays that irradiate the semiconductor crystal changes, the carrier concentration generated by the X-rays in the semiconductor crystal (e.g., the first semiconductor crystal, etc.) may change, so a resistivity of the semiconductor material may also change.

In some embodiments, if the temperature of the semiconductor crystal (e.g., the first semiconductor crystal, etc.) changes, a hot carrier concentration generated inside the semiconductor material may also change, and the resistivity of the semiconductor material may change.

In some embodiments, the irradiation module 610 may irradiate the first semiconductor crystal of the detector using X-ray(s) generated by the tube.

In 220, a voltage of the first semiconductor crystal and a photocurrent of the first semiconductor crystal may be obtained. The photocurrent may be generated by an irradiation of the X-ray(s) on the first semiconductor crystal.

During a normal operation of the photon-counting detector, the voltage may be applied on the semiconductor crystal. In some embodiments, the voltage applied on the first semiconductor crystal may be a relatively high voltage. For example, the relatively high voltage may be a voltage in the order of kilovolts. As shown in FIG. 7, a voltage 1411 represents the high voltage applied on the (first) semiconductor crystal. In some embodiments, the detection of the radiation dose received by the first semiconductor crystal may be performed under a situation that the first semiconductor crystal is irradiated by the X-ray(s), and the voltage applied on the first semiconductor crystal may be obtained under the situation that the first semiconductor crystal is irradiated by the X-ray(s).

The photocurrent may refer to a current generated by the irradiation of the X-ray(s) on the first semiconductor crystal. In some embodiments, the detection of the radiation dose received by the first semiconductor crystal may be performed under the situation that the first semiconductor crystal is irradiated by the X-ray(s).

In some embodiments, an acquisition module 620 may obtain the voltage applied on the first semiconductor crystal and the photocurrent. For example, the acquisition module 620 may obtain the voltage applied on the first semiconductor crystal in the imaging device 140 via the network 120.

For example, the acquisition module 620 may measure the voltage and current applied on the first semiconductor crystal. For example, as shown in FIG. 7, V and A in FIG. 7 represent a voltmeter and an ammeter, respectively. The voltage and the current applied on the first semiconductor crystal may be measured by the voltmeter and the ammeter, respectively. In some embodiments, the acquisition module 620 may be used to monitor the voltage and the current of the photon-counting detector by the voltmeter and the ammeter, and then may determine whether the photon-counting detector works normally under the high voltage.

In some embodiments, the detector may include a plurality of first semiconductor crystals, a count of the first semiconductor crystals may be at least two, and the voltage applied on the first semiconductor crystals and photocurrent obtained by the acquisition module 620 may be a total voltage and a total current applied on the at least two first semiconductor crystals. In some embodiments, the count of the first semiconductor crystals may be at least two, and the acquisition module 620 may respectively obtain voltages applied on different first semiconductor crystals and currents on different first semiconductor crystals. Each first semiconductor crystal may correspond to one voltage and one photocurrent, respectively. The count of the first semiconductor crystals may be determined based on the actual needs. The voltage applied on the first semiconductor crystals may include the total voltage or a voltage applied on one of the first semiconductor crystals, and the photocurrent applied on the first semiconductor crystals may include the total photocurrent or a photocurrent applied on one of the first semiconductor crystals, which may also be determined based on the actual needs.

In some embodiments, the acquisition module 620 may apply a bias voltage to a semiconductor crystal (e.g., a first semiconductor crystal), and measure the photocurrent of the first semiconductor crystal or a dark current of the semiconductor crystal based on the bias voltage.

When a photon counting detector operates normally, the voltage applied on the semiconductor crystal may be a bias voltage. Under the action of the bias voltage, the acquisition module 620 may measure the photocurrent of the first semiconductor crystal or measure the dark current of the first semiconductor crystal. For example, the acquisition module 620 may measure the photocurrent of the first semiconductor crystal, the dark current of the first semiconductor crystal, etc., by the ammeter.

In 230, based on the voltage, the photocurrent, and a preset relationship, a radiation dose received by the first semiconductor crystal may be determined.

In some embodiments, the preset relationship may indicate a variation of a resistivity of the semiconductor crystal or the photocurrent with the radiation dose, a temperature of the semiconductor crystal, etc. In some embodiments, the preset relationship may include a first relationship and a second relationship. The first relationship may indicate a variation of a resistivity of the first semiconductor crystal or the photocurrent with the radiation dose. The second relationship may indicate a variation of a resistivity of the semiconductor crystal or the photocurrent with the temperature. More description for the first relationship may be found elsewhere in the present disclosure, for example, FIG. 3 and the relevant description. More description for the second relationship may be found elsewhere in the present disclosure, for example, FIGS. 4, 5 and the relevant description.

In some embodiments, radiation dose may refer to a dose of the X-ray irradiating on the first semiconductor crystal. The first semiconductor crystal may include 2 planes. A first plane may be an irradiated plane of the X-ray, such as the m-plane of the first semiconductor crystal as shown in FIG. 7. The m-plane of the first semiconductor crystal may be seen as a planar electrode. A second plane may be an input plane of the ASIC, such as the n-plane of the first semiconductor crystal shown in FIG. 7. The radiation dose received by the first semiconductor crystal may be a radiation dose received by the m-plane. In some embodiments, the radiation dose received by the first semiconductor crystal may be a radiation dose received by the whole crystal of the first semiconductor crystal. If the count of the first semiconductor crystal is at least two, and the voltage applied on the at least two first semiconductor crystals is the total voltage of the at least two first semiconductor crystals, the radiation dose may be a total radiation dose received by the at least two first semiconductor crystals.

In some embodiments, a determination module 630 may determine the radiation dose received by the first semiconductor crystal based on the voltage, the photocurrent, and the preset relationship. For example, the preset relationship indicates a variation of the photocurrent with the radiation dose, and the determination module 630 may bring the photocurrent of the first semiconductor crystal into the preset relationship to obtain the radiation dose received by the first semiconductor crystal.

In some embodiments, the determination module 630 may determine a resistivity of the first semiconductor crystal based on the voltage and the photocurrent, and determine the radiation dose based on the resistivity and the preset relationship (e.g., the first relationship). In some embodiments, the determination module 630 may determine the radiation dose based on the photocurrent under the bias voltage and the preset relationship (e.g., the first relationship). More description may be found elsewhere in the present disclosure, for example, FIG. 3 and the relevant description.

In some embodiments of the present disclosure, since the voltage applied on the first semiconductor crystal is a relatively high voltage, the voltage and current under the relatively high voltage may need to be monitored. By monitoring the voltage applied on the first semiconductor crystal and the corresponding current, the radiation dose received by the first semiconductor crystal may be monitored based on feature(s) of the current and the voltage of the first semiconductor crystal, which may improve the efficiency and accuracy of real-time quantitative monitoring of the radiation dose, and may reduce the complexity of system design without introducing additional reference detectors into the CT system.

In some embodiments, the determination module 630 may correct the performance of the detector based on the radiation dose. In some embodiments, the determination module 630 may correct a hardware component of the detector based on the radiation dose. The hardware component may include a first semiconductor crystal, a second crystal, a circuit structure, etc.

In some embodiments, the determination module 630 may determine whether a detection performance of the first semiconductor crystal and a working state of an output circuit are normal by comparing a count of photons corresponding to the radiation dose and an actual output count of photons corresponding to the first semiconductor crystal. The determination module 630 may determine the temperature of the semiconductor crystal by determining the resistivity of the semiconductor crystal, and use the temperature of the semiconductor crystal to correct an output temperature value of a temperature sensor of the detector. The determination module 630 may optimize the high voltage applied on the semiconductor crystal by determining the resistivity of the semiconductor crystal. More descriptions for the temperature of semiconductor crystal may be found elsewhere in the present disclosure, for example, FIG. 4 and the relevant description.

In some embodiments, due to an existence of pulse stacking phenomenon and the stability problem of semiconductor crystal under the X-ray irradiation, an output signal (e.g., a count of photons) of the detector may also have a certain deviation, which may be corrected to a certain extent.

In some embodiments, the determination module 630 may correct the output signal of the detector based on the radiation dose. The output signal may include an output signal corresponding to the first semiconductor crystal, an output signal corresponding to the second crystal, an output circuit signal. For example, the determination module 630 may determine a count of photons corresponding to the radiation dose based on the radiation dose. The determination module 630 may compare the count of photons corresponding to the radiation dose and an actual output count of photons corresponding to the first semiconductor crystal, and then determine a difference between these two counts of photons. The difference may represent by an offset. The determination module 630 may correct the actual output count of photons corresponding to the first semiconductor crystal based on the difference, thus reducing or eliminating the offset.

In some embodiments, the determination module 630 may correct the output signal (e.g., the count of photons) corresponding to the first semiconductor crystal by the following formula. For example, formula (1) is shown as below:

$$R = k(\phi, T)R_0. \tag{1}$$

In formula (1), $R_0$ is an original count of photons corresponding to the first semiconductor crystal; R is a corrected count of photons corresponding to the first semiconductor crystal; k is a correction coefficient, which is a function of the radiation dose φ received by the first semiconductor crystal with the temperature T of the first semiconductor crystal.

In some embodiments of the present disclosure, the determination module 630 may correct the output signal corresponding to the first semiconductor crystal based on the radiation dose, which may reduce the impact of pulse stacking, semiconductor crystal instability, etc., on the output signal (e.g., a count of photons), and more accurate and stable count of photons may be obtained.

The second crystal may refer to another crystal of the photon-counting detector that is different from the first semiconductor crystal. The second crystal may be a crystal with the same material and/or structure as the first semiconductor crystal. The first semiconductor crystal may be located at a position of the photon-counting detector that is not obstructed by the human body, and the second crystal may be located at a position of the photon-counting detector that is obstructed by the human body. Due to being obstructed by the human body, the output signal corresponding to the second crystal may have a certain deviation.

In some embodiments, the determination module 630 may correct the output signal corresponding to the second crystal that is obstructed by an object based on the radiation dose received by the first semiconductor crystal that is not obstructed by the object. For example, based on a change of the radiation dose received by the first semiconductor crystal that is not obstructed by the object, the determination module 630 may correct the output signal corresponding to the second crystal that is obstructed by the object based on the change of the radiation dose.

In some embodiments of the present disclosure, the determination module 630 may correct the output signal corresponding to the second crystal based on the radiation dose corresponding to the first semiconductor crystal. Therefore, the CT detector may act as a reference detector, without introducing additional reference detectors into the CT system, which may improve the efficiency of monitoring radiation dose and reduce the complexity of system design.

In some embodiments, the determination module 630 may perform an auxiliary correction on an output circuit signal based on the resistivity of the first semiconductor crystal corresponding to the radiation dose.

The output circuit refers to a circuit that can perform operations of amplifying, shaping, collecting, analog-to-digital converting, outputting, and other operations on the output signal of the semiconductor crystal, such as the ASIC.

In some embodiments, the determination module 630 may perform the auxiliary correction on the output circuit signal of the first semiconductor crystal based on the resistivity of the first semiconductor crystal corresponding to the radiation dose. For example, the determination module 630 may adjust a detection threshold of the output circuit for different first semiconductor crystals. The determination module 630 may optimize the first semiconductor crystal based on working state(s) of different first semiconductor crystals. In some embodiments, the determination module 630 may also optimize the voltage applied on the semiconductor crystal.

In some embodiments of the present disclosure, the determination module 630 may perform the auxiliary correction on the output circuit signal based on the resistivity of the first semiconductor crystal corresponding to the radiation dose, and may optimize the working state(s) of different first semiconductor crystals accordingly.

In some embodiments, the determination module 630 may compensate the leakage current of the ASIC based on the radiation dose.

There may be a leakage current compensation circuit in the ASIC. The leakage current compensation circuit may refer to a circuit used to compensate a leakage current. In a normal operation, the first semiconductor crystal corresponding to the radiation dose may correspond to a resistivity, and the first semiconductor crystal may have a corresponding current output, which may be called the leakage current. Based on leakage current, certain compensation may be required. The determination module 630 may compensate the leakage current of the ASIC based on the resistivity of the first semiconductor crystal corresponding to the radiation dose. For example, the determination module 630 may feedback the resistivity of the first semiconductor crystal to the ASIC, assisting in correcting the leakage current compensation of the leakage current compensation circuit.

In some embodiments of the present disclosure, the determination module 630 may compensate the leakage current of the ASIC based on the radiation dose, which may make the ASIC work more stably and normally.

Figure 3:
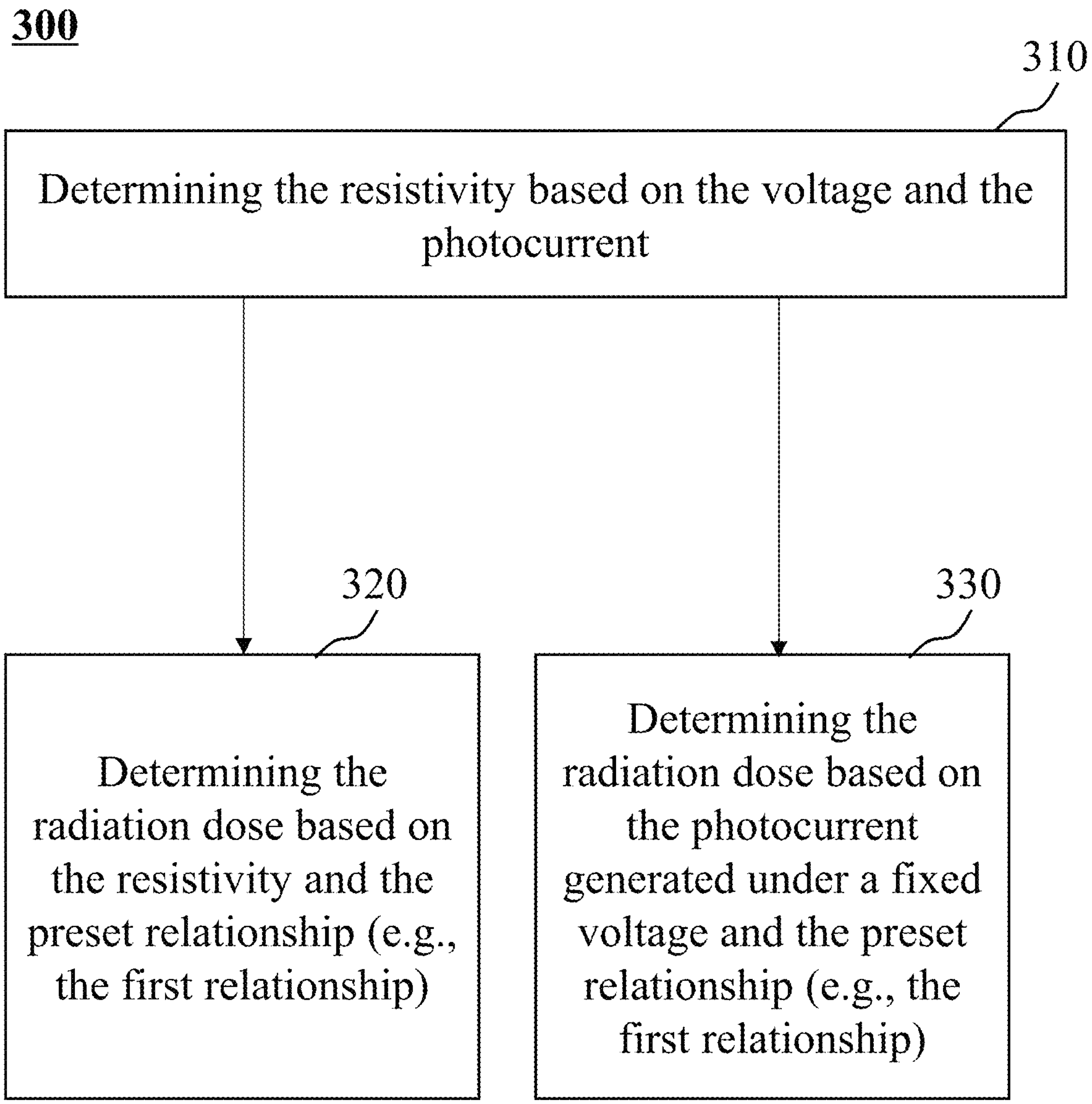
FIG. 3 is a flowchart illustrating an exemplary process for determining an X-ray radiation dose according to some embodiments of the present disclosure.

FIG. 3 is a flowchart illustrating an exemplary process for determining an X-ray radiation dose according to some embodiments of the present disclosure. In some embodiments, process 300 may be performed by the determination module 630.

In 310, a resistivity may be determined based on the voltage and the photocurrent.

In some embodiments, the determination module 630 may determine the resistivity based on the voltage and the photocurrent. For example, when X-rays irradiate on the first semiconductor crystal, a certain carrier concentration may be generated inside the first semiconductor crystal. Based on the carrier concentration, a resistance of the first semiconductor crystal may be determined, thereby determining the resistivity of the first semiconductor crystal.

In 320, a radiation dose may be determined based on the resistivity and a preset relationship (e.g., a first relationship).

The first relationship of the preset relationship may include various relationships. For example, the first relationship a indicates a variation of the resistivity with the radiation dose. The first relationship b indicates a variation of the photocurrent with the radiation dose. In some embodiments, the first relationship may be represented by a formula, and different formulas may represent variations of different parameters of the first semiconductor crystal. In some embodiments, the first relationship may be preset.

In some embodiments, the preset relationship (e.g., the first relationship) may indicate a variation of the resistivity of the first semiconductor crystal or the photocurrent with the radiation dose.

The resistivity of the first semiconductor crystal may represent a feature of the resistance of the first semiconductor crystal.

Figure 8A:
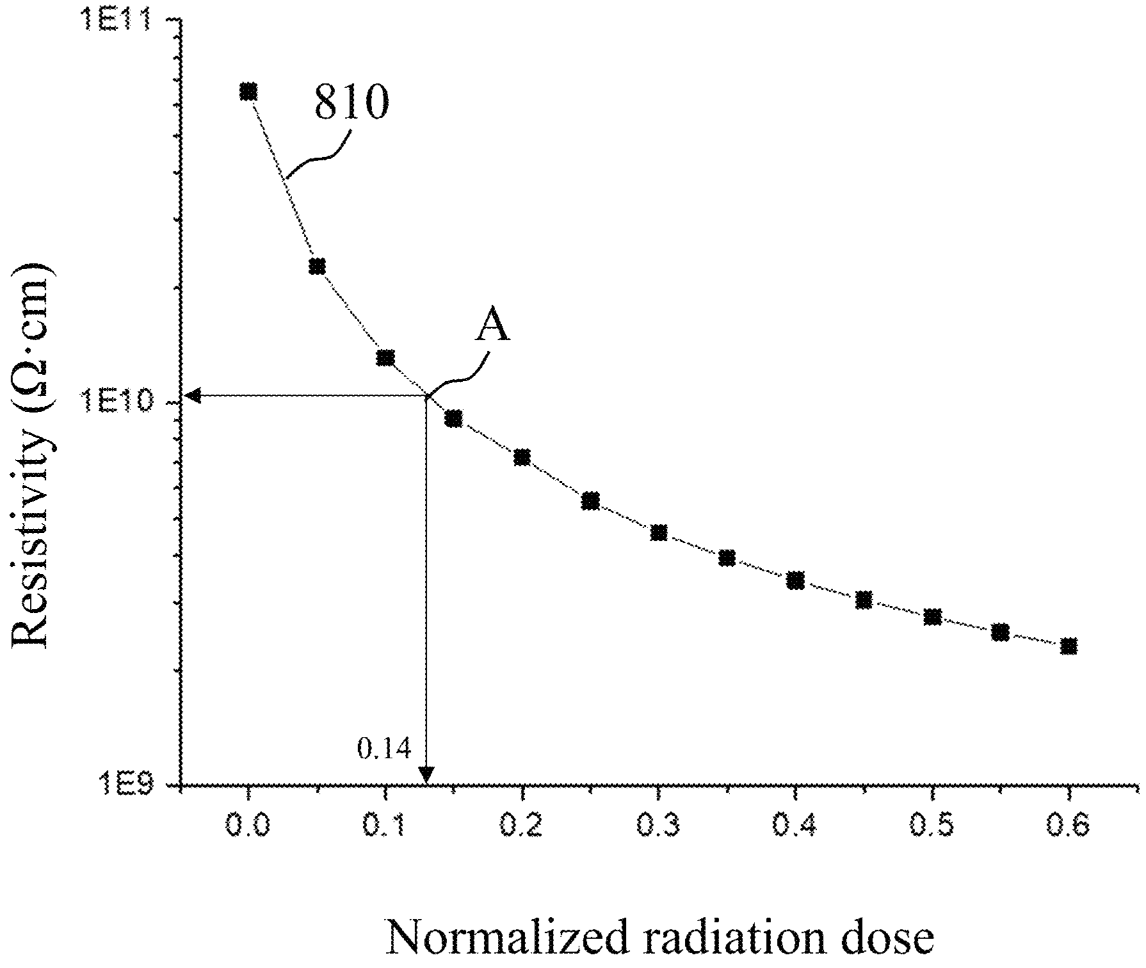
FIG. 8A is a schematic diagram illustrating an exemplary relationship indicating a variation of a resistivity of a cadmium zinc telluride (CZT) crystal with a normalized radiation dose according to some embodiments of the present disclosure.

In some embodiments, the resistivity of the first semiconductor crystal may change with a change of the radiation dose. There may be a certain relationship between the resistivity of the first semiconductor crystal and the radiation dose. As shown in FIG. 8A, a curve 810 represents the first relationship a (e.g., the relationship indicating the variation of the resistivity of a CZT crystal with a normalized radiation dose). Based on the resistivity, the determination module 630 may determine radiation dose based on a certain conversion.

In some embodiments, the determination module 630 may obtain the first relationship in various ways. For example, the determination module 630 may obtain various first relationships corresponding to different parameters by detecting the resistivity or photocurrent of the first semiconductor crystal under different radiation doses in a current time period. The various first relationships may correspond to the current time period. Each of the plurality of first relationships can correspond to a formula. At different time periods, the first relationships may be different.

In some embodiments, the determination module 630 may obtain a preset relationship (e.g., the first relationship) by detecting the resistivity of the first semiconductor crystal or the photocurrent under different radiation doses.

The resistivity or the photocurrent may vary with the radiation dose. In some embodiments, the determination module 630 may detect the resistivity of the first semiconductor crystal or photocurrent under different radiation doses, thus obtaining a plurality of relationships between a plurality of different resistivities or photocurrents and different radiation doses. The determination module 630 may determine a corresponding table relating to different parameters of the first semiconductor crystal or different formulas corresponding to the different parameters based on the above relationships. The determination module 630 may determine the corresponding table or the different formulas mentioned above as the first relationship. The determination module 630 may store the first relationship in the storage device 130. When the first relationship needs to be used, the determination module 630 may obtain the first relationship by looking up the corresponding table or retrieving the corresponding formula.

In some embodiments of the present disclosure, the determination module 630 may ensure the accuracy of the first relationship obtained by detecting the resistivity of the first semiconductor crystal or photocurrent under different radiation doses to determine the preset relationship (e.g., the first relationship), thus ensuring the accuracy of the radiation dose corresponding to the first semiconductor crystal.

In some embodiments, the determination module 630 may determine the radiation dose based on the resistivity and the preset relationship (e.g., the first relationship). For example, the first relationship may indicate the variation of the photocurrent of the first semiconductor crystal with the radiation dose. The determination module 630 may determine the radiation dose based on the resistivity and the first relationship. For example, the first relationship is the first relationship a shown in curve 810 shown in FIG. 8A, and the resistivity corresponding to point A is 1E10 Ω·cm. The determination module 630 may obtain the normalized radiation dose corresponding to point A based on the resistivity corresponding to point A and the first relationship a (e.g., the normalized radiation dose is about 0.14).

In 330, based on the photocurrent generated under the fixed voltage and the preset relationship (e.g., the first relationship), the radiation dose may be determined.

Figure 8B:
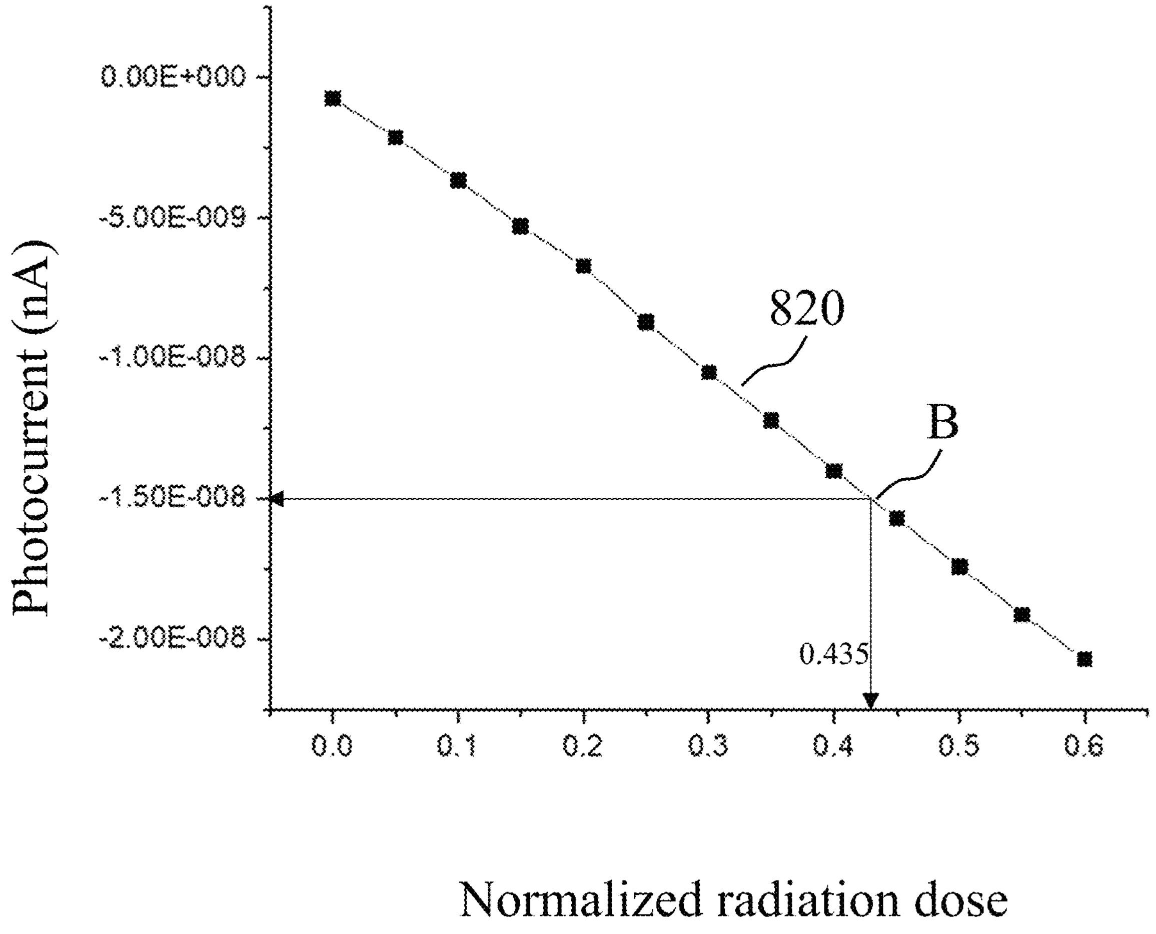
FIG. 8B is a schematic diagram illustrating an exemplary relationship indicating a variation of a photocurrent of a CZT crystal with a normalized radiation dose according to some embodiments of the present disclosure.

In some embodiments, the photocurrent may be a current generated under the fixed bias voltage. The determination module 630 may determine the radiation dose based on the photocurrent and the preset relationship (e.g., the first relationship). For example, the determination module 630 may determine the radiation dose based on the photocurrent and the first relationship b (the relationship indicating a variation of the photocurrent with the radiation dose). The determination module 630 may bring the photocurrent of the first semiconductor crystal into the first relationship b to determine the radiation dose received by the first semiconductor crystal. For example, the first relationship is the first relationship b shown in the curve 820 shown in FIG. 8B, and the photocurrent corresponding to point B is −1.50E-008 nA. The determination module 630 may obtain the normalized radiation dose corresponding to point B based on the photocurrent corresponding to point B and the first relationship b (e.g., the normalized radiation dose is about 0.435).

In some embodiments, the determination module 630 may determine a relationship between the carrier concentration of the first semiconductor crystal and the resistivity of the first semiconductor crystal based on the resistivity of the first semiconductor crystal by a formula (2). For example, the formula (2) may be shown as below:

$$\rho = \frac{1}{q\left[(n_0 + \Delta n)\mu_n + (p_0 + \Delta p)\mu_p\right]}. \tag{2}$$

In formula (2), ρ is the resistivity; $n_0$ and $p_0$ are concentrations of thermal equilibrium electrons and holes in the first semiconductor crystal, respectively; Δn and Δp are a concentration of electrons generated by the first semiconductor crystal irradiated by the X-ray radiation and a concentration of holes generated by the first semiconductor crystal irradiated by the X-ray radiation, respectively; $\mu_n$ and $\mu_p$ are a migration rate of electrons in the first semiconductor crystal and a migration rate of holes in the first semiconductor crystal.

In some embodiments, the determination module 630 may determine the radiation exposure corresponding to the first semiconductor crystal based on the carrier concentration in the first semiconductor crystal based on formula (3). The formula (3) is shown as below:

$$\Delta n = \Delta p = \int\int \frac{cE}{w} \exp(-\mu x)\, dEdx. \tag{3}$$

In formula (3), c is a count of X-photons reaching the first semiconductor crystal under a certain energy, E is an X-photon energy, w is a generation energy of an electron-hole pair in the first semiconductor crystal, μ is a linear attenuation coefficient of the X-ray, x is a thickness of the semiconductor crystal in the direction of the X-ray irradiation.

In some embodiments of the present disclosure, the determination module 630 may determine the resistivity of the first semiconductor crystal based on the voltage and the photocurrent, and then determine the corresponding radiation exposure based on the resistivity or photocurrent and the preset relationship (e.g., the first relationship). The features of the current and the voltage of the first semiconductor crystal may be used to monitor the corresponding radiation exposure of the first semiconductor crystal, which may improve the efficiency and accuracy of real-time quantitative monitoring of the radiation does, and additional reference detectors may not need to be introduced in the CT system, thus reducing the complexity of system design.

Figure 4:
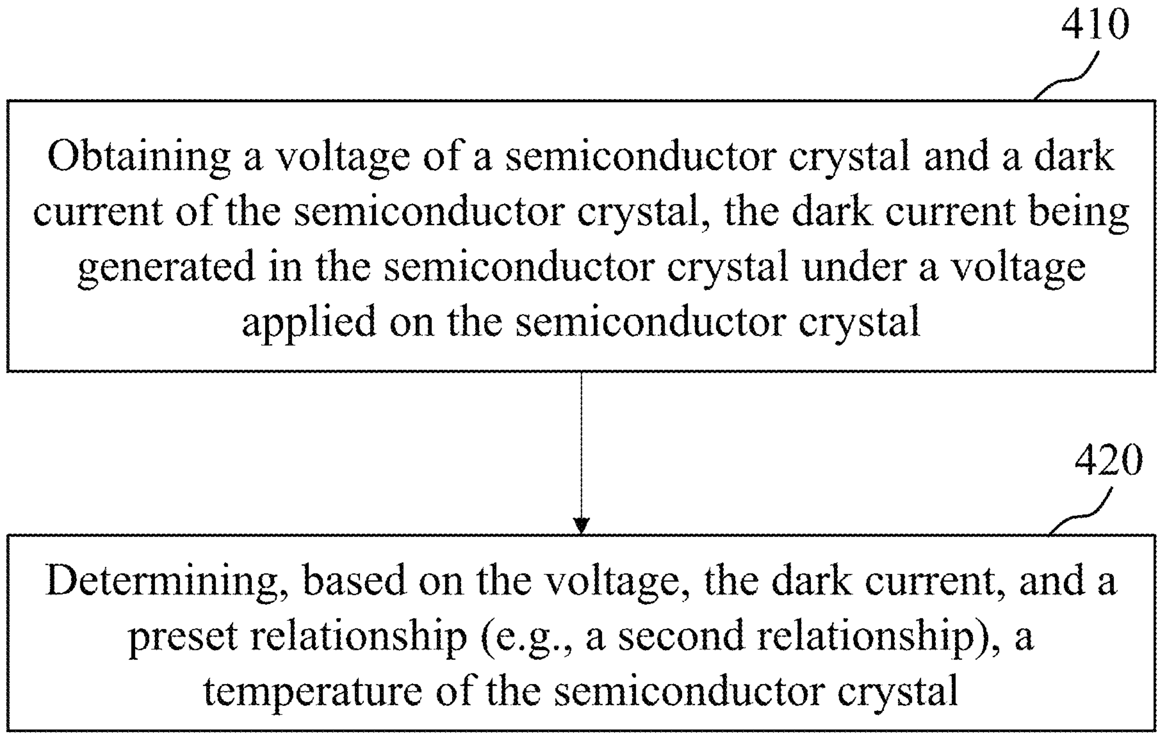
FIG. 4 is a flowchart illustrating an exemplary process for detecting a temperature of an X-ray detector according to some embodiments of the present disclosure.

FIG. 4 is a flowchart illustrating an exemplary process for detecting a temperature of an X-ray detector according to some embodiments of the present disclosure. As shown in FIG. 4, process 400 may include one or more of the following operations. In some embodiments, process 400 may be performed by the processing device 110.

In 410, a voltage of a semiconductor crystal and a dark current of the semiconductor crystal may be obtained. The dark current may be generated in the semiconductor crystal under a voltage applied on the semiconductor crystal.

The dark current may refer to a current generated in the semiconductor crystal without an X-ray irradiation. The dark current may be a current generated in the semiconductor crystal under the bias voltage applied on the semiconductor crystal.

In some embodiments, the acquisition module 620 may obtain the voltage and the dark current of the semiconductor crystal. In some embodiments, the acquisition module 620 may obtain the voltage and dark current of the semiconductor crystal when there is no x-ray exposure.

The descriptions of operation 420 is similar to the descriptions of the operation 220, except that the voltage and the dark current of the semiconductor crystal are obtained when there is no X-ray irradiation on the semiconductor crystal in operation 420, while the voltage and the dark current of the first semiconductor crystal are obtained when the first semiconductor crystal is irradiated by the X-ray(s) in operation 220. Detailed descriptions for operation 420 may be found in the description for the operation 220.

In 420, based on the voltage, the dark current, and a preset relationship (e.g., the second relationship), a temperature of the semiconductor crystal may be obtained.

In some embodiments, the second relationship may refer to a variation of a resistivity of the semiconductor crystal or the dark current with the temperature of the semiconductor crystal. The second relationship may include various relationships. For example, the second relationship c represents a variation of the resistivity with the temperature of the semiconductor crystal. The second relationship d represents a variation of the dark current with the temperature of the semiconductor crystal. In some embodiments, the second relationship may be represented by a formula, and different formulas may represent variations of different parameters of the semiconductor crystal. In some embodiments, the second relationship may be preset. More description for the second relationship may be found elsewhere in the present disclosure, for example, FIG. 5 and the relevant description.

The temperature of the semiconductor crystal may refer to a temperature of the semiconductor crystal itself. Under different conditions, the temperature of the semiconductor crystal may vary.

In some embodiments, the determination module 630 may determine the temperature of the semiconductor crystal based on the voltage, the dark current, and the preset relationship (e.g., the second relationship). For example, the second relationship represents the variation of dark current with the temperature of the semiconductor crystal. The determination module 630 may bring the dark current of the semiconductor crystal into the second relationship to determine the temperature of the semiconductor crystal.

In some embodiments, the determination module 630 may continuously determine the temperature of the semiconductor crystal at different time points based on the voltage and the dark current obtained.

In some embodiments, the determination module 630 may determine the resistivity of the semiconductor crystal based on the voltage and the dark current, and determine the temperature of the semiconductor crystal based on the preset relationship (e.g., the second relationship) and the resistivity or the dark current. More descriptions may be found elsewhere in the present disclosure, for example, FIG. 5 and the relevant descriptions.

In some embodiments of the present disclosure, the determination module 630 may determine the temperature of the semiconductor crystal based on the voltage, the dark current, and the preset relationship (e.g., the second relationship), which may continuously determine the temperature of the semiconductor crystal of the detector, thus improving the accuracy of determining the temperature of the semiconductor crystal, and thus facilitating the monitoring and improvement of detector performance.

In some embodiments, the determination module 630 may adjust a hardware parameter of the detector based on the temperature of the semiconductor crystal. In some embodiments, the determination module 630 may adjust a heating and/or a heat dissipation device based on the temperature of the semiconductor crystal to keep the temperature of the semiconductor crystal within a preset temperature range.

In some embodiments, the determination module 630 may optimize a working parameter of an output circuit of the detector based on a relationship between the temperature of the semiconductor crystal (determined based on the voltage, the dark current, and the preset relationship), the temperature of the semiconductor crystal determined using other method(s) (e.g., a temperature determined using a temperature sensor), a detection efficiency of the semiconductor crystal, a signal formation mode, or the like, to improve the stability, uniformity, and other performance of the output circuit at different temperatures.

In some embodiments, the determination module 630 may correct a change of a detector response caused by a change of the temperature based on the temperature of the semiconductor crystal (determined based on the voltage, the dark current, and the preset relationship), and the temperature of the semiconductor crystal determined using other method(s) (e.g., a temperature determined using a temperature sensor), a detector output intensity, a mechanical displacement, etc.

The heating and/or heat dissipation device may refer to a device that can heat and/or dissipate heat of the semiconductor crystal.

The preset temperature range may refer to a temperature range within which the semiconductor crystal can work normally. In some embodiments, the determination module 630 may determine a preset temperature range based on the actual needs.

In some embodiments, the determination module 630 may determine whether the temperatures of the semiconductor crystal at different time points are within the predetermined temperature range. If a temperature of the semiconductor crystal is not within the preset temperature range, the determination module 630 may adjust the heating and/or heat dissipation device to heat or dissipate heat on the semiconductor crystal, thereby increasing or decreasing the temperature of the semiconductor crystal, to keep the temperature of the semiconductor crystal within the preset temperature range.

In some embodiments of the present disclosure, the determination module 630 may adjust the hardware parameter of the detector based on the temperature of the semiconductor crystal to ensure the normal operation of the detector. In some embodiments of the present disclosure, the determination module 630 may adjust the heating and/or heat dissipation device based on the temperature of the semiconductor crystal, so that the temperature of the semiconductor crystal is within the preset temperature range, which may convert the X-ray into an electronic hole, ensure the normal operation of the detector, and monitor whether the detector works normally.

Figure 5:
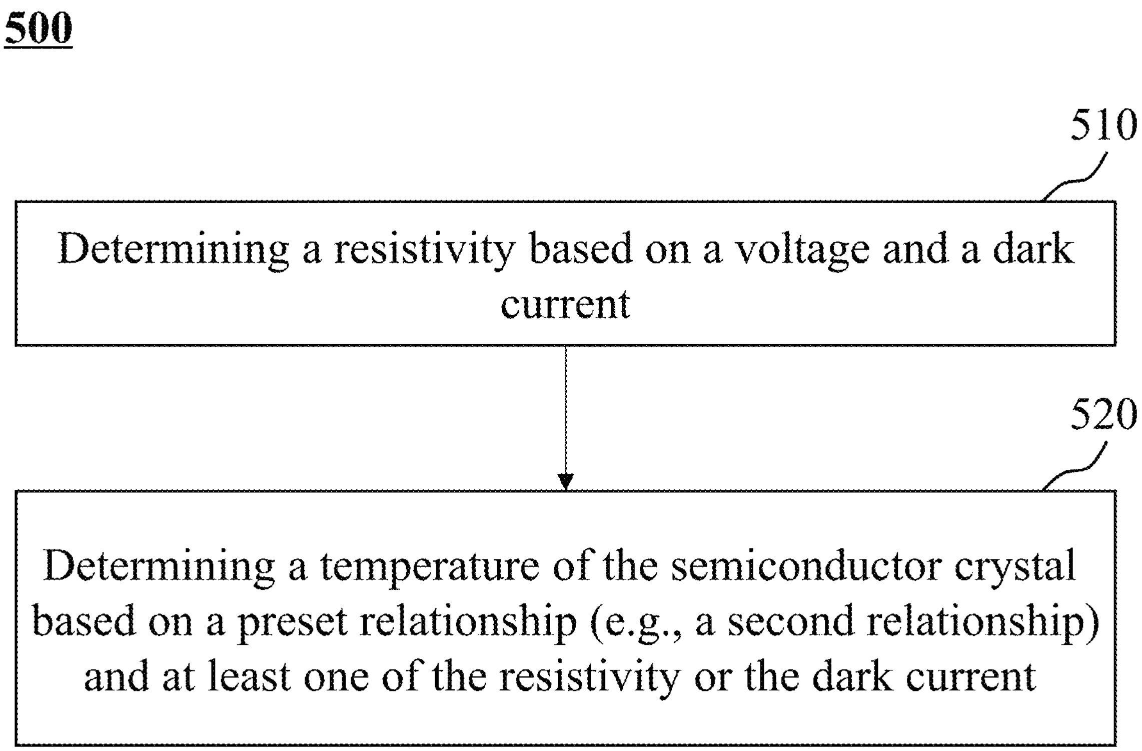
FIG. 5 is a flowchart illustrating an exemplary process for determining a temperature of an X-ray detector according to some embodiments of the present disclosure.

FIG. 5 is a flowchart illustrating an exemplary process for determining a temperature of an X-ray detector according to some embodiments of the present disclosure. In some embodiments, process 500 may be performed by the determination module 630.

In 510, a resistivity may be determined based on a voltage and a dark current.

In some embodiments, the determination module 630 may determine the resistivity based on the voltage and the dark current. For example, determination module 630 may determine a resistance of a semiconductor crystal based on a relationship between the voltage, the dark current, and the resistance. The determination module 630 may determine the resistivity of the semiconductor crystal based on the resistance.

In 520, a temperature of the semiconductor crystal may be determined based on a preset relationship (e.g., a second relationship) and at least one of the resistivity and the dark current.

In some embodiments, the second relationship may be a relationship indicating a variation of the resistivity of the semiconductor crystal or the dark current with the temperature of the semiconductor crystal. The resistivity of the semiconductor crystal may represent a feature of the resistance of the first semiconductor crystal.

Figure 9A:
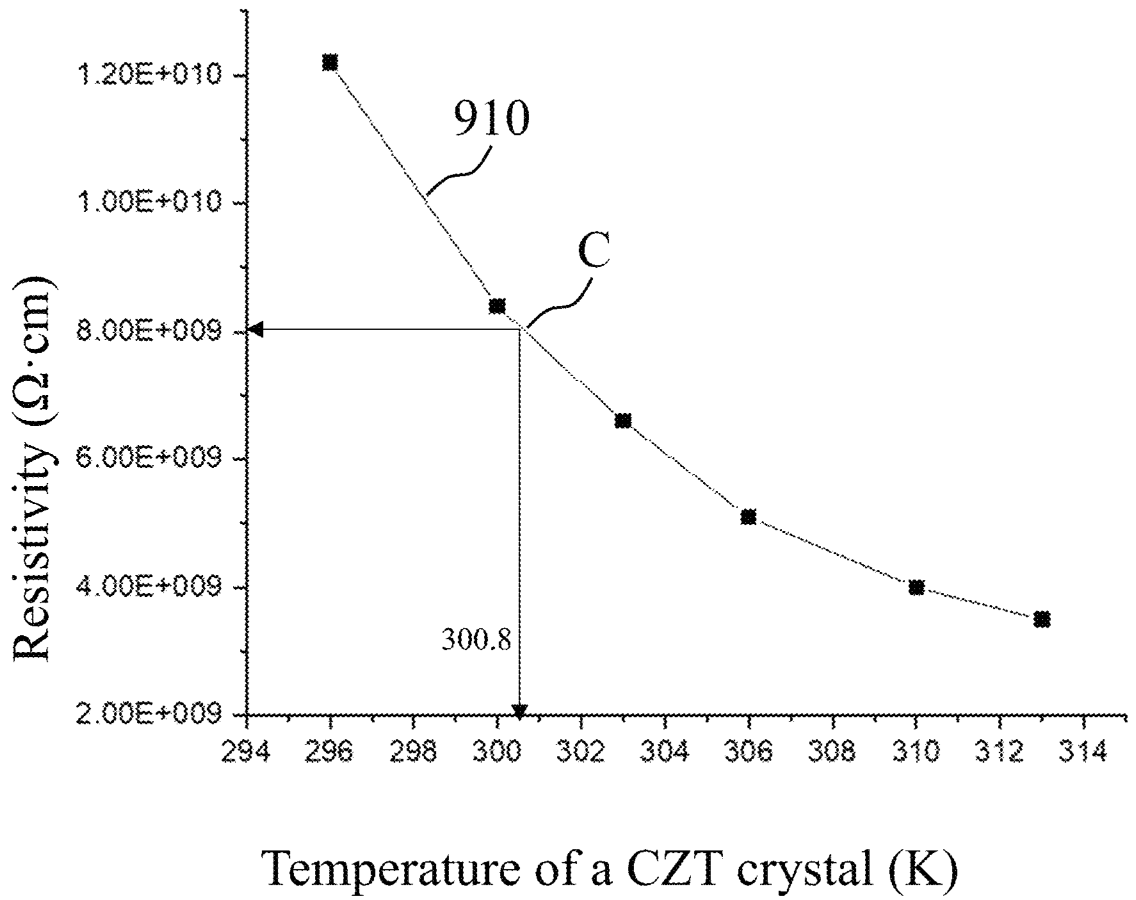
FIG. 9A is a schematic diagram illustrating an exemplary relationship indicating a variation of a resistivity of a CZT crystal with a temperature of the CZT crystal according to some embodiments of the present disclosure.

In some embodiments, the resistivity of a semiconductor crystal or the dark current may vary with the temperature of the semiconductor crystal. There is a certain variation of the resistivity of semiconductor crystal or the dark current with the temperature of the semiconductor crystal. As shown in FIG. 9A, a curve 910 represents the second relationship c (e.g., a variation of a resistivity of a CZT crystal with a temperature of the CZT crystal). Based on the resistivity, the determination module 630 may determine the temperature of the CZT crystal based on a certain conversion. Similarly, there is a certain variation of the dark current of the semiconductor crystal with the temperature of semiconductor crystal (e.g., a second relationship d). The determination module 630 may determine the temperature of the semiconductor crystal based on a certain conversion and the dark current.

In some embodiments, the determination module 630 may obtain the second relationship in various ways. For example, determination module 630 may obtain a plurality of second relationships between the resistivity or the current dark with the temperature of the semiconductor crystal by detecting the resistivity or dark current of the semiconductor crystal under different temperatures during a time period. The second relationship may be a second relationship corresponds to the time period. Each of the plurality of second relationships may correspond to a formula. The second relationship may vary at different time periods.

In some embodiments, the determination module 630 may obtain the preset relationship (e.g., the second relationship) by detecting the resistivity or dark current of the semiconductor crystal under different temperatures.

The semiconductor crystal under different temperatures may be obtained based on a constant temperature platform with a variable temperature. For example, the semiconductor crystal may be arranged on the constant temperature platform, and the temperature of the constant temperature platform may be adjusted based on the actual needs to obtain the semiconductor crystal under different temperatures.

In some embodiments, the determination module 630 may detect the resistivity or the dark current of semiconductor crystal under different temperatures, thereby obtaining the plurality of preset relationships between different resistivities or dark currents and different temperatures of the semiconductor crystal. The determination module 630 may determine a table between the different resistivities or dark current of the semiconductor crystal and the different temperatures of the semiconductor crystal based on the plurality of preset relationships, or different formulas for the plurality of preset relationships between different resistivities or dark current and different temperatures of the semiconductor crystal. The determination module 630 may determine the table or different formulas mentioned above as the second relationship. The determination module 630 may store the second relationship in the storage device 130. When the second relationship needs to be used, the determination module 630 may obtain the second relationship by looking up the table or retrieving a corresponding formula.

In some embodiments of the present disclosure, the determination module 630 may obtain the second relationship by detecting the resistivity or the dark current of the semiconductor crystal under different temperatures, which may ensure the accuracy of the obtained second relationship and thus ensure the accuracy of the determined temperature of the semiconductor crystal.

In some embodiments, the determination module 630 may determine the temperature of the semiconductor crystal based on the preset relationship (e.g., the second relationship), and the resistivity or dark current. For example, the second relationship may be a relationship indicating a variation of the resistivity of the semiconductor crystal with the temperature of the semiconductor crystal. The determination module 630 may determine the temperature of the semiconductor crystal based on the resistivity and second relationship. For example, the second relationship c shown in the curve 910 in FIG. 9A corresponds to a resistivity of 8.00E+

Figure 9B:
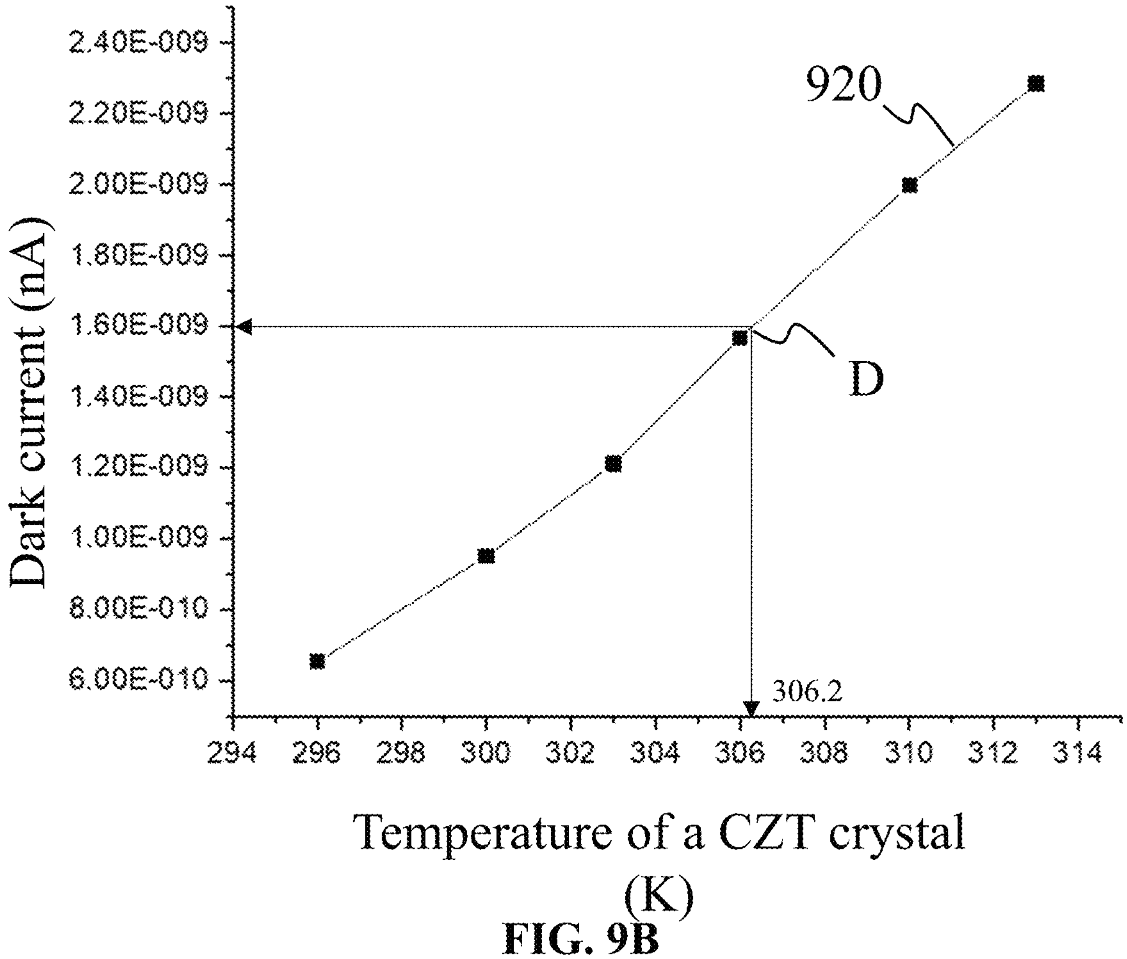
FIG. 9B is a schematic diagram illustrating an exemplary relationship indicating a variation of a dark current of a CZT crystal with a temperature of the CZT crystal according to some embodiments of the present disclosure.

009 Ω·cm. The determination module 630 may determine the temperature (e.g., the temperature of the semiconductor crystal is about 300.8K) of the semiconductor crystal corresponding to point C based on the resistivity corresponding to point C and the second relationship c. For example, the second relationship may be a relationship indicating a variation of the dark current of the semiconductor crystal and the temperature of the semiconductor crystal. The determination module 630 may determine the temperature of the semiconductor crystal based on the dark current and the second relationship. For example, the second relationship is shown in curve 920 in FIG. 9B. The dark current corresponding to point D is 1.6E-009 nA. The determination module 630 may determine the temperature (e.g., the temperature of the semiconductor crystal is about 306.2K) of the semiconductor crystal corresponding to point D based on the dark current corresponding to point D and the second relationship d.

In some embodiments, the determination module 630 may determine the temperature of the semiconductor crystal based on the resistivity and a formula (4). For example, formula (4) is shown as below:

$$\rho(T_{ref}) = \rho(T)\exp\left(\alpha\left(\frac{1}{T_{ref}} - \frac{1}{T}\right)\right). \tag{4}$$

In formula (4), ρ is a resistivity of the semiconductor crystal; $T_{ref}$ is a reference temperature; T is a temperature of the semiconductor crystal; and α is a temperature coefficient of the semiconductor crystal.

As another example, the determination module 630 may determine the relationship between the resistivity and a carrier concentration in the semiconductor crystal based on a formula (5). The formula (5) is shown as below:

$$\rho_1 = \frac{1}{q_1[n_{01}\mu_{n1} + p_{01}\mu_{p1}]}. \tag{5}$$

In formula (5), $\rho_1$ is a resistivity of the semiconductor crystal; $n_{01}$ and $p_{01}$ are a concentration of thermal equilibrium electrons and a concentration of holes in the semiconductor crystal, respectively; $\mu_{n1}$ and $\mu_{p1}$ are a migration rate of electrons in the semiconductor crystal and a migration rate of holes in the semiconductor crystal, respectively; and $q_1$ is an electron charge.

The determination module 630 may determine a relationship between the carrier concentration in the semiconductor crystal and the temperature of the semiconductor crystal based on a formula (6). The formula (6) is shown as below:

$$n_{01}p_{01} = N_cN_v\exp\left(\frac{-E_g}{k_bT}\right). \tag{6}$$

In formula (6), $N_c$ and $N_v$ are an effective density of a bottom of a conduction band of the semiconductor crystal and an effective density of a top of a valence band of the semiconductor crystal, respectively; $E_g$ is a bandgap width of the semiconductor crystal; $k_b$ is a Boltzmann constant. For a high resistance semiconductor crystal, a Fermi level may be considered as pinned in the middle of the bandgap of the semiconductor crystal, then $n_{01} \approx p_{01}$.

In some embodiments of the present disclosure, the determination module 630 may determine the resistivity based on the voltage and the dark current, and determine the temperature of the semiconductor crystal based on the predetermined relationship (e.g., the second relationship), and the resistivity or dark current, thus improving the accuracy of the determined temperature of the semiconductor crystal, thereby facilitating the monitoring and improvement of detector performance.

It should be noted that the above descriptions of the process are merely provided for illustrative purposes, and may not be intended to limit the scope of the present disclosure. For those of ordinary skill in the art, various changes and modifications may be made under the guidance of the present disclosure. However, these changes and modifications may not deviate from the scope of the present disclosure.

Figure 6:
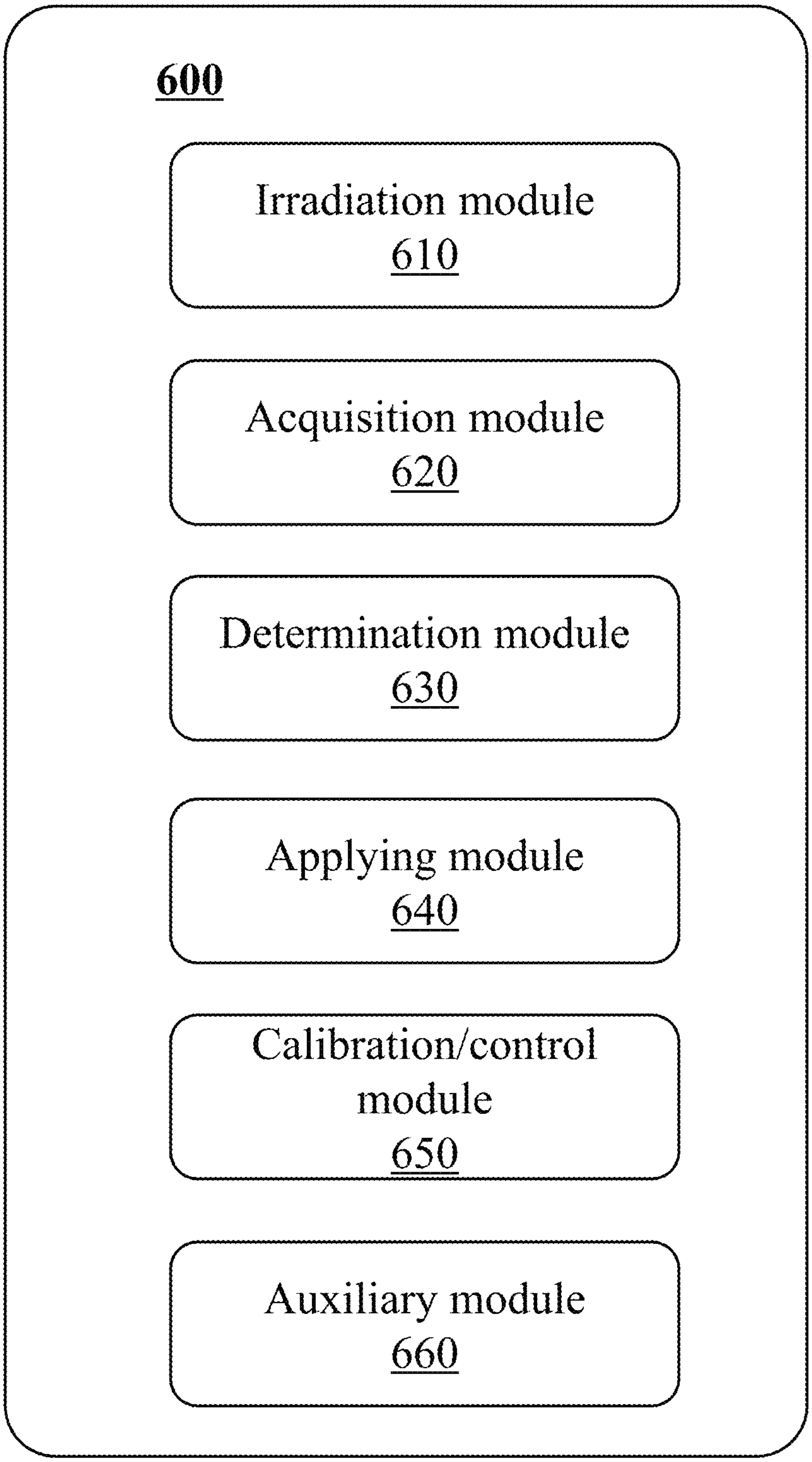
FIG. 6 is a block diagram illustrating an exemplary imaging system according to some embodiments of the present disclosure.

FIG. 6 is a block diagram illustrating an exemplary imaging system according to some embodiments of the present disclosure.

In some embodiments, an imaging system 600 may include an irradiation module 610, an acquisition module 620, a determination module 630, an applying module 640, a calibration/control module 650, and an auxiliary module 660.

In some embodiments, the applying module 640 may be used to apply a voltage on a semiconductor crystal of a detector of an imaging device.

In some embodiments, the acquisition module 620 may be used to obtain a current of the semiconductor crystal.

In some embodiments, the determination module 630 may be used to determine at least one parameter of the semiconductor crystal based on the voltage, the current, and at least one preset relationship.

In some embodiments, the calibration/control module 650 may be used to calibrate and/or control the imaging device based on the at least one parameter.

In some embodiments, the current may include a photocurrent generated by X-ray irradiation on the semiconductor crystal, and the at least one parameter may include a radiation dose received by the semiconductor crystal.

In some embodiments, the at least one preset relationship may include a relationship indicating a variation of the resistivity of the semiconductor crystal or the photocurrent with the radiation dose.

In some embodiments, the calibration/control module 650 may further be used to calibrate a performance of the detector based on the radiation dose.

In some embodiments, the current may be a dark current generated in the semiconductor crystal in response to the bias voltage, and the at least one parameter may include a temperature of the semiconductor crystal.

In some embodiments, the at least one preset relationship may include a relationship indicating a variation of a resistivity of the semiconductor crystal or the dark current with the temperature.

In some embodiments, the calibration/control module 650 may be further used to adjust a heating device and/or a heat dissipation device of the imaging device based on the temperature of the semiconductor crystal to ensure that the temperature of the semiconductor crystal is within a preset temperature range.

In some embodiments, the voltage includes a first voltage applied on a first moment and a second voltage applied on a second moment, the at least one parameter may include a radiation dose received by the semiconductor crystal corresponding to the first voltage and a temperature of the semiconductor crystal corresponding to the second voltage, and the first moment is different from the second moment, and the first voltage and the second voltage may be different.

In some embodiments, the bias voltage may be applied intermittently.

In some embodiments, applying the bias voltage intermittently may include: setting a time interval between different view angles or view angle ranges of an imaging process of the imaging device; and applying the bias voltage within one or more view angles or one or more view angle ranges, or within the time interval.

In some embodiments, the auxiliary module 660 may be used to use a light to irradiate the semiconductor crystal to eliminate or reduce an instability of the semiconductor crystal.

In some embodiments, the irradiation module 610 may be used to irradiate a first semiconductor crystal of a detector using an X-ray generated by a tube.

In some embodiments, the acquisition module 620 may be used to obtain a voltage of the first semiconductor crystal and a photocurrent of the first semiconductor crystal, the photocurrent being generated by an irradiation of the X-ray on the first semiconductor crystal.

In some embodiments, the acquisition module 620 may be used to obtain a voltage of the semiconductor crystal and a dark current of the semiconductor crystal, the dark current being generated in the semiconductor crystal under a bias voltage applied on the semiconductor crystal.

In some embodiments, the determination module 630 may be used to determine a radiation dose received by the first semiconductor crystal based on the voltage, the photocurrent, and a preset relationship (e.g., a first relationship).

In some embodiments, determination module 630 may be used to determine a temperature of the semiconductor crystal based on the voltage, the dark current, and a preset relationship (e.g., a second relationship).

In some embodiments, the first semiconductor crystal or the semiconductor crystal may include a semiconductor material.

In some embodiments, the acquisition module 620 may also be used to apply a bias voltage on the first semiconductor crystal; and measure the photocurrent under an application of the bias voltage.

In some embodiments, the acquisition module 620 may also be used to apply the bias voltage on the semiconductor crystal; and measure the dark current under an application of the bias voltage.

In some embodiments, the preset relationship (e.g., the first relationship) may indicate a variation of a resistivity of the first semiconductor crystal or the photocurrent with the radiation dose.

In some embodiments, the determination module 630 may also be used to determine the resistivity based on the voltage and the photocurrent, and determine the radiation dose based on the resistivity and the preset relationship (e.g., the first relationship); or determine the radiation dose based on the photocurrent generated under a fixed bias voltage and the preset relationship (e.g., the first relationship).

In some embodiments, the determination module 630 may also be used to calibrate a performance of the detector based on the radiation dose.

In some embodiments, the determination module 630 may also be used to calibrate a hardware component of the detector based on the radiation dose. The hardware component may include at least one of the first semiconductor crystal, a second crystal of the detector, or a circuit of the detector; and/or calibrate an output signal of the detector based on the radiation dose. The output signal may include at least one of an output signal corresponding to the first semiconductor crystal, an output signal corresponding to the second crystal, and an output signal corresponding to the circuit.

In some embodiments, the preset relationship (e.g., the second relationship) may indicate a variation of a resistivity of the semiconductor crystal or the dark current with the temperature.

In some embodiments, the determination module 630 may also be used to determine the resistivity based on the voltage and the dark current; and determine the temperature of the semiconductor crystal based on the preset relationship (e.g., the second relationship), and at least one of the resistivity and the dark current.

In some embodiments, the determination module 630 may also be used to adjust a hardware parameter of the X-ray detector based on the temperature of the semiconductor crystal.

In some embodiments, the determination module 630 may also be used to adjust a heating device and/or a heat dissipation device of an imaging device including the X-ray detector based on the temperature of the semiconductor crystal to ensure that the temperature of the semiconductor crystal is within a preset temperature range.

It should be understood that the imaging system and the modules shown in FIG. 6 may be implemented in various ways. For example, in some embodiments, the imaging system and the modules may be implemented via hardware, software, or a combination thereof.

It should be noted that the above descriptions of the imaging system and the modules are merely described for convenience and may not limit the scope of the present disclosure. It can be understood that for those of ordinary skill in the art, after understanding the principle of the imaging system, combine various modules or form subsystems to connect with other modules without deviating from this principle may be made arbitrarily. In some embodiments, the irradiation module 610, the acquisition module 620, the determination module 630, the applying module 640, the calibration/control module 650, and the auxiliary module 660 disclosed in FIG. 6 may be different modules in the same system, or a module that implements the functions of two or more modules mentioned above. For example, each module may share a common storage module, and each module may also have its own storage module. Such deformations are within the scope of the present disclosure.

Figure 10:
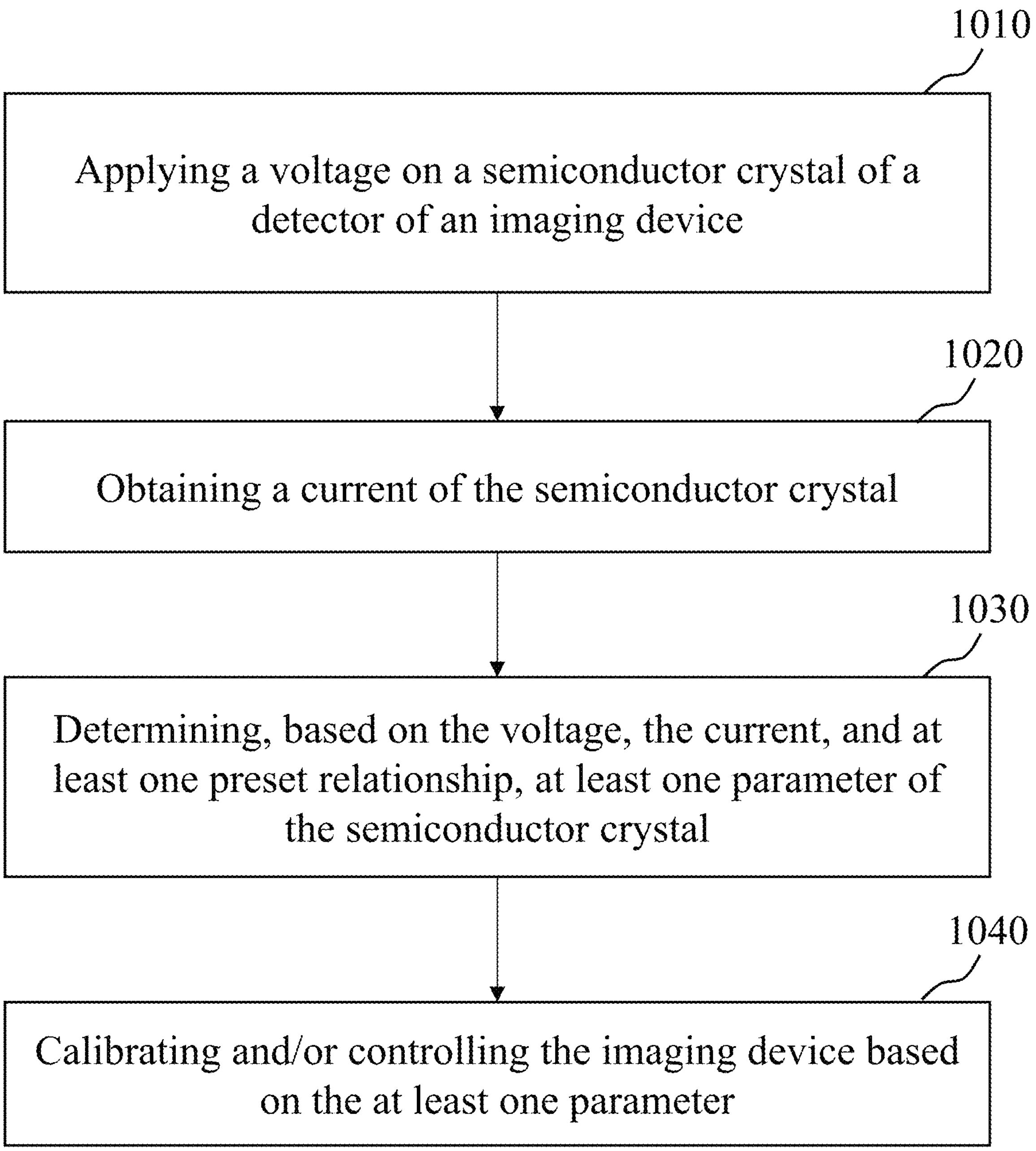
FIG. 10 is a flowchart illustrating an exemplary process for controlling an imaging device according to some embodiments of the present disclosure.

FIG. 10 is a flowchart illustrating an exemplary process for controlling an imaging device according to some embodiments of the present disclosure. As shown in FIG. 10, process 1000 may include one or more of the following operations. In some embodiments, process 1000 may be performed by the processing device 110.

In 1010, a voltage may be applied on a semiconductor crystal of a detector of the imaging device.

In some embodiments, the voltage, the bias voltage, and a high voltage described in the present disclosure may be used interchangeably and represented as the same voltage. applied to the semiconductor crystal of the detector of the imaging device. In some embodiments, a magnitude of the bias voltage may be various. Under different circumstances, the magnitude(s) of the bias voltage(s) may be the same or different. For example, the bias voltage of the imaging device used during an imaging process for a patient and the bias voltage used in a process of obtaining a current of the semiconductor crystal may be the same or different. The magnitude of the bias voltage may be provided based on actual needs under different situations.

More descriptions for the imaging device and the detector may be found elsewhere in the present disclosure, for example, FIG. 1 and the relevant description. More descriptions for the semiconductor crystal, the voltage, and the bias voltage may also be found elsewhere in the present disclosure, for example, FIG. 2 and the relevant description.

In some embodiments, the voltage may be applied on the semiconductor crystal to make the detector work normally. The processing device 110 may apply the voltage on the semiconductor crystal of the detector of the imaging device using a pressure applying device (e.g., a high-voltage source) in the imaging device.

In some embodiments, the bias voltage may be applied intermittently. Applying the bias voltage intermittently may refer that the bias voltage applied to the semiconductor is intermittent over time. For example, the detector is not always in a working state, and the working state of the detector is intermittent. The processing device 110 may apply the bias voltage in a non-working state before or after the working state of the detector (e.g., at a certain moment before or after the working state, which is close to the time period of the working state).

In some embodiments of the present disclosure, applying the bias voltage intermittently may eliminate the influence of instability in the detector, improve the accuracy of the obtained current, and thus facilitating the accuracy of determining the at least one parameter.

In some embodiments, applying the bias voltage intermittently may include setting a time interval between different view angles or view angle ranges of an imaging process of the imaging device; and applying the bias voltage within one or more view angles or one or more view angle ranges, or within the time interval.

In some embodiments, the processing device 110 may rotate the detector (e.g., 360 degrees) during the imaging process of the patient by the imaging device. By rotating 360 degrees, the processing device 110 may enable the detector to scan the patient from different view angles.

The different view angles may refer to different angles for scanning the patient by the detector. Angle values and a count of the different view angles may be provided based on the actual needs. For example, the count of the view angles may be 2400, 4800, etc.

In some embodiments, the processing device 110 may set the time interval between different view angles or view angle ranges based on the actual needs.

A view angle range may refer to an angle range used for scanning the patient. The processing device 110 may apply the bias voltage on the semiconductor crystal within the view angle range to determine the at least one parameter of the semiconductor crystal.

The time interval may refer to an interval between different view angles or view angle ranges. The time interval between different view angles or view angle ranges represents a time period when the patient is not scanned.

In some embodiments, the processing device 110 may apply the same or different bias voltages at different view angles or view angle ranges. The at least one parameter of the semiconductor crystal may be determined when the object is scanned or not scanned, and the bias voltage(s) used thereof may be the same or different. The processing device 110 may set magnitudes of the bias voltages within different view angles or view angle ranges based on the actual needs.

Similarly, the processing device 110 may apply the same or different bias voltages at different time intervals.

In some embodiments, the processing device 110 may perform a switching operation on the bias voltage (stopping or reapplying the bias voltage) at different view angles or view angle ranges, or at time intervals. In some embodiments, the bias voltage applied to the semiconductor crystal may be intermittent and switched high-frequently. By switching the bias voltage, the processing device may apply the same or different bias voltages within different view angles or view angle ranges.

In some embodiments of the present disclosure, applying the bias voltage at different view angles or within different viewing ranges, or applying the bias voltage within one or more view angles or one or more view angle ranges, or within the time intervals may further eliminate the influence of instability of the detector itself, improve the accuracy of the obtained current, and thereby facilitating the accuracy of determining the at least one parameter.

In 1020, a current of the semiconductor crystal may be obtained.

In some embodiments, the processing device 110 may obtain the current of the semiconductor crystal by measurement. For example, the processing device 110 may measure the current of the semiconductor crystal by an ammeter. More descriptions for obtaining the current of semiconductor crystal may be found elsewhere in the present disclosure, for example, FIGS. 2, 4 and the relevant description.

In 1030, at least one parameter of the semiconductor crystal may be determined based on the voltage, the current, and at least one preset relationship.

More descriptions for the voltage, the current, and the at least one preset relationship may be found elsewhere in the present disclosure, for example, FIGS. 2, 5 and the relevant description.

The at least one parameter of the semiconductor crystal may refer to at least one parameter related to the semiconductor crystal.

In some embodiments, the current may include a photocurrent generated by X-ray irradiation on the semiconductor crystal, and the at least one parameter may include a radiation dose received by the semiconductor crystal. More descriptions for the photocurrent and the radiation dose may be found elsewhere in the present disclosure, for example, FIGS. 2, 3 and the relevant description.

In some embodiments, the at least one preset relationship may include a relationship indicating a variation of a resistivity of the semiconductor crystal or the photocurrent with the radiation dose. The semiconductor crystal and the first semiconductor crystal may be semiconductor crystals corresponding to different detectors. The relationship indicating the variation of the resistivity of the semiconductor crystal or the photocurrent with the radiation dose may be similar to the relationship indicating the variation of the resistivity of the first semiconductor crystal with the radiation dose, which may be described in FIG. 3 in detail. More descriptions for the at least one preset relationship may be found elsewhere in the present disclosure, for example, FIGS. 2, 3 and the relevant descriptions.

In some embodiments, the current may include a dark current generated in the semiconductor crystal in response to the bias voltage, and the at least one parameter may include a temperature of the semiconductor crystal. More descriptions for the dark current and temperature of semiconductor crystal may be found elsewhere in the present disclosure, for example, FIGS. 4, 5 and the relevant description.

In some embodiments, the at least one preset relationship may include a relationship indicating a variation of a resistivity of the semiconductor crystal or the dark current with the temperature. More descriptions may be found elsewhere in the present disclosure, for example, FIGS. 4, 5 and the relevant descriptions.

In some embodiments, the preset relationship may be determined based on a machine learning technique. In some embodiments, the at least one parameter of the semiconductor crystal may be determined, by a parameter determination model, based on the voltage, the current, and the preset relationship. In some embodiments, the parameter determination model may be trained based on a plurality of sets of training samples and a plurality of labels. In some embodiments, each training sample of the plurality of sets of training samples may include a sample voltage, a sample current, and a sample preset relationship. A corresponding label may be at least one parameter of a sample semiconductor crystal. The plurality of set of training samples may be obtained based on historical data. The plurality of labels may be manually annotated.

In some embodiments, the voltage includes a first voltage applied on a first moment and a second voltage applied on a second moment, the at least one parameter may include a radiation dose received by the semiconductor crystal corresponding to the first voltage and a temperature of the semiconductor crystal corresponding to the second voltage, and the first moment is different from the second moment, and the first voltage and the second voltage may be different.

The first voltage may refer to a voltage applied on the semiconductor crystal when determining the radiation dose. The second voltage may refer to a voltage applied on the semiconductor crystal when determining the temperature.

In some embodiments, the first voltage and the second voltage may be different. For example, if the voltage is relatively high, the current of the semiconductor crystal may also be relatively high, which may affect the temperature of the semiconductor crystal. In order to increase the temperature of the semiconductor crystal, the processing device 110 may apply a smaller second voltage on the semiconductor crystal when determining the temperature. As another example, when determining the radiation dose, it is desirable to achieve a complete collection of radiation for reducing the instability of the output signal of the detector. The first voltage applied on the semiconductor crystal may be relatively large, so as to determine the radiation dose. Magnitudes of the first voltage and the second voltage may be determined based on the actual needs.

In some embodiments of the present disclosure, the voltages applied on the semiconductor crystal in determining the radiation dose and the temperature of the semiconductor crystal may be different, which may further improve the accuracy of the at least one parameter and is conducive to improve the accuracy of subsequent calibration and/or control of the imaging device.

In 1040, the imaging device may be calibrated and/or controlled based on the at least one parameter.

In some embodiments, the processing device 110 may calibrate a performance of the detector based on the radiation dose. More descriptions may be found elsewhere in the present disclosure, for example, FIG. 2 and the relevant description.

In some embodiments, the processing device 110 may adjust a heating device and/or a heat dissipation device of the imaging device based on the temperature of the semiconductor crystal to ensure that the temperature of the semiconductor crystal is within a preset temperature range. More descriptions may be found elsewhere in the present disclosure, for example, FIG. 4 and the relevant description.

In some embodiments, the processing device 110 may use a light to irradiate the semiconductor crystal to eliminate or reduce an instability of the semiconductor crystal.

The light may be of various types, such as an infrared light. The imaging device may include an infrared light irradiation device. The infrared light irradiation device may be located close to the semiconductor crystal, facilitating all-round illumination of the semiconductor crystal. The processing device 110 may irradiate the semiconductor crystal with light based on the auxiliary module 660. A direction and a time of light irradiation on the semiconductor crystal may be determined based on the actual needs.

The main reason for the unstable output signal of the detector is the presence of some defects inside the semiconductor crystal used by the detector. The defects inside the semiconductor crystal are sensitive to light within a certain wavelength. When using the light to irradiate the semiconductor crystal, the defects inside the semiconductor crystal may be saturated in advance or the release of charge carriers may be accelerated, thereby eliminating or reducing the instability of the semiconductor crystal and making the output signal of the detector more stable.

In some embodiments of the present disclosure, a non-transitory computer readable medium is provided. The non-transitory computer readable medium may store instructions, the instructions, when executed by at least one processor, causing the at least one processor to implement a method for controlling an imaging device, a method for detecting an X-ray radiation dose, a method for detecting a temperature of an X-ray detector, and/or a method for controlling and/or calibrating an imaging device.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine each of which has at least one processor and at least one storage device for controlling an imaging device, comprising:
   - applying a voltage on a semiconductor crystal of a detector of the imaging device;
   - obtaining a current of the semiconductor crystal;
   - determining, based on the voltage, the current, and at least one preset relationship, at least one parameter of the semiconductor crystal, wherein the at least one parameter includes a radiation dose received by the semiconductor crystal and/or a temperature of the semiconductor crystal, and the at least one preset relationship includes a relationship indicating a variation of a resistivity of the semiconductor crystal with the radiation dose and/or with the temperature; and
   - correcting a count of photons corresponding to the semiconductor crystal or adjusting a heating device and/or a heat dissipation device of the imaging device based on the at least one parameter.

2. The method of claim 1, wherein the current includes a photocurrent generated by X-ray irradiation on the semiconductor crystal.

3. The method of claim 1, wherein the current includes a dark current generated in the semiconductor crystal in response to the voltage.

4. The method of claim 3, wherein the adjusting a heating device and/or a heat dissipation device of the imaging device based on the at least one parameter includes:
   - adjusting, based on the temperature of the semiconductor crystal, the heating device and/or the heat dissipation device of the imaging device to ensure that the temperature of the semiconductor crystal is within a preset temperature range.

5. The method of claim 1, wherein
   - the voltage includes a first voltage applied on a first moment and a second voltage applied on a second moment,
   - the at least one parameter includes a radiation dose received by the semiconductor crystal corresponding to the first voltage and a temperature of the semiconductor crystal corresponding to the second voltage, and
   - the first moment is different from the second moment, and the first voltage and the second voltage are different.

6. The method of claim 1, wherein the voltage is applied intermittently.

7. The method of claim 6, wherein the applying the voltage intermittently includes:
   - setting a time interval between different view angles or view angle ranges of an imaging process of the imaging device; and
   - applying the voltage within one or more view angles or one or more view angle ranges, or within the time interval.

8. The method of claim 1, further comprising:
   - using a light to irradiate the semiconductor crystal to eliminate or reduce an instability of the semiconductor crystal.

9. The method of claim 1, further comprising:
   - calibrating a performance of the detector based on the radiation dose.

10. The method of claim 9, wherein the calibrating a performance of the detector based on the radiation dose includes:
   - calibrating a hardware component of the detector based on the radiation dose, wherein the hardware component includes at least one of a first semiconductor crystal, a second crystal of the detector, or a circuit of the detector; and/or
   - calibrating an output signal of the detector based on the radiation dose, wherein the output signal includes at least one of an output signal corresponding to the first semiconductor crystal, an output signal corresponding to the second crystal, or an output signal corresponding to the circuit.

11. The method of claim 1, further comprising:

adjusting a hardware parameter of the detector based on the temperature of the semiconductor crystal.

12. The method of claim 11, wherein the adjusting a hardware parameter of the detector based on the temperature of the semiconductor crystal includes:

adjusting, based on the temperature of the semiconductor crystal, the heating device and/or the heat dissipation device of the imaging device including the detector to ensure that the temperature of the semiconductor crystal is within a preset temperature range.

13. A method implemented on at least one machine each of which has at least one processor and at least one storage device for detecting an X-ray radiation dose, comprising:

irradiating a first semiconductor crystal of a detector using an X-ray generated by a tube;

obtaining a voltage of the first semiconductor crystal and a photocurrent of the first semiconductor crystal, the photocurrent being generated by an irradiation of the X-ray on the first semiconductor crystal; and determining, based on the voltage, the photocurrent, and a preset relationship, a radiation dose received by the first semiconductor crystal, wherein the preset relationship indicates a variation of a resistivity of the first semiconductor crystal or the photocurrent with the radiation dose.

14. The method of claim 13, wherein the obtaining a voltage of the first semiconductor crystal and a photocurrent of the first semiconductor crystal includes:

applying a voltage on the first semiconductor crystal; and measuring the photocurrent under an application of the voltage.

15. The method of claim 13, wherein the determining, based on the voltage, the photocurrent, and a preset relationship, a radiation dose received by the first semiconductor crystal includes:

determining the resistivity based on the voltage and the photocurrent, and determining the radiation dose based on the resistivity and the preset relationship; or determining the radiation dose based on the photocurrent generated under a fixed voltage and the preset relationship.

16. A method implemented on at least one machine each of which has at least one processor and at least one storage device for detecting a temperature of an X-ray detector, comprising:

obtaining a voltage of a semiconductor crystal and a dark current of the semiconductor crystal, the dark current being generated in the semiconductor crystal under a voltage applied on the semiconductor crystal; and determining, based on the voltage, the dark current, and a preset relationship, a temperature of the semiconductor crystal, wherein the preset relationship indicates a variation of a resistivity of the semiconductor crystal or the dark current with the temperature.

17. The method of claim 16, wherein the determining, based on the voltage, the dark current, and a preset relationship, a temperature of the semiconductor crystal includes:

determining the resistivity based on the voltage and the dark current; and determining the temperature of the semiconductor crystal based on the preset relationship and at least one of the resistivity or the dark current.

18. The method of claim 16, wherein the semiconductor crystal includes a semiconductor material.

* * * * *